United States Patent
Hodsden et al.

(12) 
(10) Patent No.: US 6,279,564 B1
(45) Date of Patent: Aug. 28, 2001

(54) ROCKING APPARATUS AND METHOD FOR SLICING A WORKPIECE UTILIZING A DIAMOND IMPREGNATED WIRE

(76) Inventors: John B. Hodsden, 824 Pollux Dr., Colorado Springs, CO (US) 80906; Steven M. Luedders, P.O. Box 20014, Colorado City, CO (US) 81019

( * ) Notice: Subject to any disclaimer, the term of this patent is extended or adjusted under 35 U.S.C. 154(b) by 0 days.

(21) Appl. No.: 09/499,057

(22) Filed: Feb. 4, 2000

Related U.S. Application Data

(63) Continuation-in-part of application No. 09/108,864, filed on Jul. 1, 1998, now Pat. No. 6,024,080, which is a continuation-in-part of application No. 08/993,007, filed on Dec. 18, 1997, now Pat. No. 5,964,210, which is a continuation-in-part of application No. 08/888,952, filed on Jul. 7, 1997, now Pat. No. 5,878,737.

(60) Provisional application No. 60/129,331, filed on Apr. 14, 1999.

(51) Int. Cl.[7] ........................................ F41B 7/00
(52) U.S. Cl. ................. 125/21; 125/16.02; 125/16.01; 140/112
(58) Field of Search ................... 125/21, 16.01, 125/16.02; 83/651.1; 451/541; 228/171, 136; 140/112

(56) References Cited

U.S. PATENT DOCUMENTS

| | | |
|---|---|---|
| 3,478,732 | 11/1969 | Clark et al. . |
| 4,727,852 | 3/1988 | Schmid et al. . |
| 5,052,366 | 10/1991 | Matsukura ........................ 125/16.01 |
| 5,564,409 | 10/1996 | Bonzo et al. . |
| 5,616,065 | 4/1997 | Egglhuber . |
| 5,628,301 | 5/1997 | Katamachi . |
| 5,645,040 | 7/1997 | Bieri Jun ............................... 125/21 |
| 5,699,782 | 12/1997 | Toyama . |
| 5,715,806 | 2/1998 | Tonegawa . |
| 5,878,737 | * 3/1999 | Hodsden ............................... 125/21 |
| 5,964,210 | 10/1999 | Hodsden ............................... 125/21 |
| 6,065,462 | * 5/2000 | Hodsden ............................... 125/21 |
| 6,112,737 | 9/2000 | Kinutani et al. ................... 125/16.02 |
| 6,182,729 | * 3/2001 | Banzawa ............................... 125/21 |

FOREIGN PATENT DOCUMENTS

| | | |
|---|---|---|
| 2604464 | 11/1977 | (DE) . |
| 591328 | 2/1978 | (SU) . |

\* cited by examiner

*Primary Examiner*—Derris H. Banks
*Assistant Examiner*—Daniel Shanley
(74) *Attorney, Agent, or Firm*—William J. Kubida; Carol W. Burton; Hogan & Hartson LLP

(57) ABSTRACT

An apparatus for cutting a substantially cylindrical work piece in a direction generally perpendicular to a longitudinal axis of the work piece includes a wire having a plurality of cutting elements affixed thereto and a wire drive mechanism for driving the wire across and through the work piece. The wire drive mechanism includes a capstan to move the wire orthogonally across a longitudinal axis of the work piece, a rotational drive to oscillate the wire around the longitudinal axis and an advancing drive to advance the wire perpendicularly through the longitudinal axis of the work piece. In a particular embodiment disclosed herein, the apparatus comprises imparts a substantially rocking motion to the wire drive mechanism about the longitudinal axis of the work piece and the cutting elements of the wire are impregnated diamonds.

18 Claims, 20 Drawing Sheets

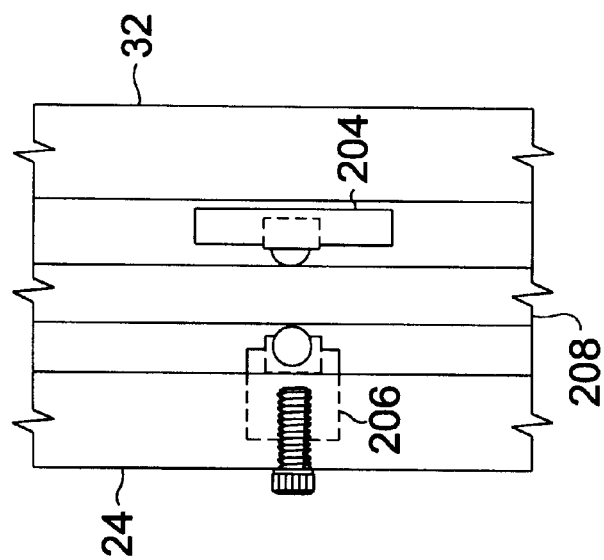
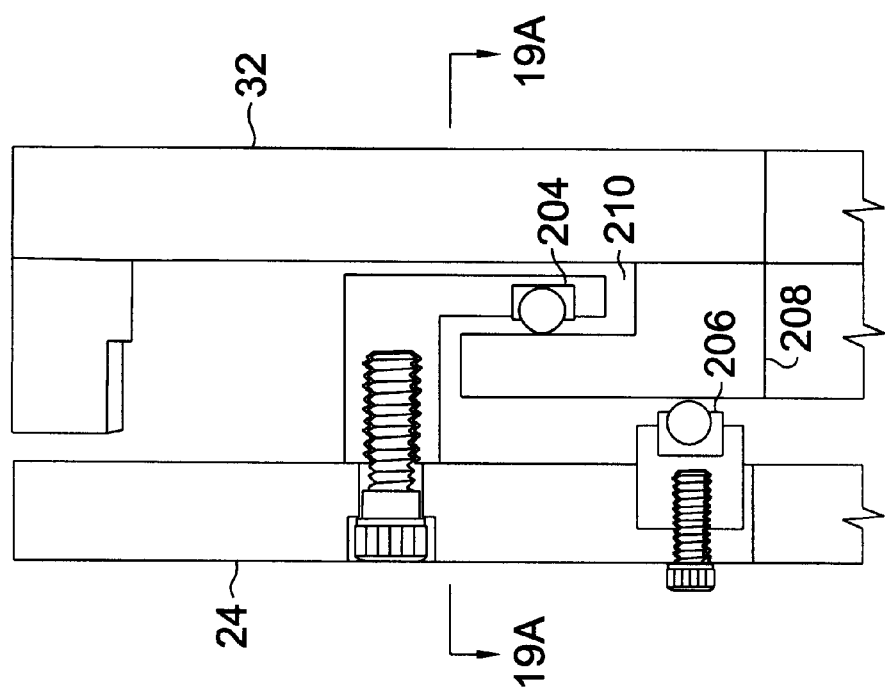
FIG. 19A
FIG. 19

ROCKING APPARATUS AND METHOD FOR SLICING A WORKPIECE UTILIZING A DIAMOND IMPREGNATED WIRE

CROSS REFERENCE TO RELATED APPLICATIONS

This application is a continuation-in-part of U.S. Pat. application Ser. No. 09/108,864, filed Jul. 1, 1998, now U.S. Pat. No. 6,024,080, which is a continuation-in-part application of U.S. Pat. application Ser. No. 08/993,007, filed Dec. 18, 1997, now U.S. Pat. No. 5,964,210, which is a continuation-in-part application of U.S. Pat. application Ser. No. 08/888,952, filed Jul. 7, 1997, now U.S. Pat. No. 5,878,737, and claims the benefit of United States Provisional Patent Application Ser. No. 60/129,331 filed Apr. 14, 1999.

BACKGROUND OF THE INVENTION

The present invention relates, in general, to the field of an apparatus and method for accurately sawing a work piece into two or more sections. More particularly, the present invention relates to an apparatus and method for cropping and/or slicing crystalline ingots, such as relatively large diameter polysilicon and single crystal silicon ingots, with great accuracy, speed and efficiency.

The vast majority of current semiconductor and integrated circuit devices are fabricated on a silicon substrate. The substrate itself is initially created utilizing raw polycrystalline silicon having randomly oriented crystallites. However, in this state, the silicon does not exhibit the requisite electrical characteristics necessary for semiconductor device fabrication. By heating high purity polycrystalline silicon at temperatures of about 1400 degrees, a single crystal silicon seed may then be added to the melt and a single crystalline ingot pulled having the same orientation of the seed. Initially, such silicon ingots had relatively small diameters of on the order of from one to four inches, although current technology can produce ingots of 150 mm (six inches) or 200 mm (eight inches) in diameter. Recent improvements to crystal growing technology now allow ingots of 300 mm (twelve inches) or 400 mm (sixteen inches) in diameter to be produced.

Once the ingot has been produced, it must be cropped (i.e. the "head" and "tail" portions of the ingot must be removed) and then sliced into individual wafers for subsequent processing into a number of die for discrete or integrated circuit semiconductor devices. The primary method for cropping the ingot is through the use of a band saw having a relatively thin flexible blade. However, the large amount of flutter inherent in the band saw blade results in a very large "kerf" loss and cutting blade serration marks which must then be lapped off.

At present, there are two primary techniques for slicing an ingot into wafers: the ID (inner diameter) hole saw and the slurry saw. The former is used predominantly in the United States in order to slice single crystal silicon and is so named due to the fact that the cutting edge of the blade adjoins a centrally located hole at its inner diameter in an attempt to reduce the flutter of the blade and resultant damage to the crystalline structure. Among the disadvantages inherent in this technique is that as silicon ingots increase in diameter, the ID hole saw must increase to three times the ingot diameter to allow it to cut all the way through the ingot to a point at which it becomes unwieldy if not unworkable.

As previously mentioned, an alternative technique also utilized in the United States but used primarily in the Pacific Rim countries is the slurry saw. The slurry saw comprises a series of mandrels about which a very long wire is looped and then driven through the ingot as a silicon carbide or boron carbide slurry is dripped onto the wire. Wire breakage is a significant problem and the saw down time can be significant when the wire must be replaced. Further, as ingot diameters increase to 300 mm to 400 mm the drag of the wire through the ingot reaches the point where breakage is increasingly more likely unless the wire gauge is increased resulting in greater "kerf" loss. Importantly, a slurry saw can take many hours to cut through a large diameter ingot.

As is the case with the ID hole saw technique as well, excessive "kerf" loss results in less wafers being able to be sliced from a given ingot with a concomitant greater cost per wafer. Moreover, the score marks of the ID hole saw and less than even cutting of the slurry saw wires result in an increased need for lengthy and expensive lapping operations to make the surfaces of the wafer smooth and parallel as well as to remove other surface markings and defects. This excessive lapping also requires even greater amounts of silicon carbide and oil or aluminum oxide slurries, the ultimate disposal of which gives rise to well known environmental concerns.

Laser Technology West, Limited, Colorado Springs, Colo., a manufacturer and distributor of diamond impregnated cutting wires and wire saws, has previously developed and manufactured a proprietary diamond impregnated wire marketed under the trademarks Superwire™ and Superlok™. These wires comprise a very high tensile strength steel core with an electrolytically deposited surrounding copper sheath into which very small diamonds (on the order of between 20 to 120 microns) are uniformly embedded. A nickel overstrike in the Superlok wire serves to further retain the cutting diamonds in the copper sheath. The technique of cutting fixed work pieces with a direction reversing diamond wire is one that has been utilized, to date, primarily in a laboratory environment and not in a production process due to the inherently very slow cutting speed involved.

SUMMARY OF THE INVENTION

Disclosed herein is an apparatus and method for slicing a work piece, in particular, a polysilicon or single crystal silicon ingot utilizing a diamond impregnated wire in which the work piece is held stationary and the wire saw drive mechanism is reciprocally rotated or rocked back and forth through an arc about the work piece longitudinal axis relative to the diamond wire as the diamond wire is driven orthogonally to the longitudinal axis of the work piece. This motion produces a vertical cut in the work piece that has an arcuate bottom with the wire continually being maintained in a substantially tangent relation to the bottom of the cut. The wire drive mechanism is advanced from a position adjoining the outer diameter ("OD") of the ingot through the ingot as the kerf or cut deepens. In this manner, the diamond wire cuts through the work piece at a point substantially tangential to the circumference of the cut, i.e., tangential to the bottom of the kerf along the length of the cut. The speed of advancement of the wire drive mechanism is controlled preferably automatically to maintain a constant force of the wire saw wire against the polysilicon at the bottom of the kerf. This is accomplished by maintaining a constant amount or angle of deflection of the saw wire as it travels through the cut. Through use of this technique, polysilicon or single crystal silicon ingots of 300 mm to 400 mm or more may be sliced into wafers relatively quickly, with minimal "kerf" loss and less extensive follow-on lapping operations than with conventional machines.

The presently preferred embodiment of the apparatus comprises a frame, a work piece support mechanism attached to the frame for positioning, leveling and holding a work piece beneath a wire having a plurality of cutting elements affixed thereto, a wire drive mechanism for moving the wire orthogonally with respect to a longitudinal axis of the work piece, a wire drive mechanism rotation mechanism coupled to the wire drive mechanism for rotating the wire drive mechanism about the work piece's longitudinal axis, and a wire advancing mechanism mounted on the frame which positions the wire drive mechanism and thus the cutting wire from a first tangential position proximate an outer surface of the work piece, sequentially through the work piece, to a second tangential position proximate the opposite side of the outer surface of the work piece.

The work piece, in particular, a silicon ingot, is preferably held stationary and leveled in a support mechanism which includes a pair of computer controlled "V" blocks on a computer controlled indexing bed connected to the frame and which is positioned beneath the wire drive mechanism. The frame includes a pair of spaced apart upright members. An inverted, U shaped yoke is movably fastened to and between the upright support members. Rotatably fastened to this yoke is the wire drive mechanism. The wire drive mechanism is reciprocally rotated or rocked through a predetermined arc about the work piece by the rotation mechanism while the wire drive mechanism advancing mechanism advances the wire drive mechanism vertically from a first position above or proximate an outer surface of the work piece to a second position proximate the outer surface on the opposite side of the work piece. The angle of the arc varies and is typically up to about an included angle of 60 degrees. The angle is varied depending on the depth of the cut through the ingot. For example, at the beginning of the cut through the ingot, the wire drive mechanism is not rotated at all, but is held stationary at a position in which the saw wire passes horizontally across the surface of the ingot. As the cut deepens, rotation begins with the arc starting off very small, only a few degrees and then is progressively increased as the cut progresses. This rocking, reciprocal, movement of the wire drive mechanism about the ingot permits the kerf to provide lateral guidance to the wire during the cut while maintaining the wire substantially tangential to the bottom of the cut and advantageously minimizes the effects created by surface irregularities on the ingot on the precision of the cut.

Another feature of the invention is a unique capstan arrangement that eliminates the potential for broken wire from becoming entangled in the wire drive mechanism which has previously been experienced. This capstan arrangement provides a complete enclosure of the capstan drive members thus precluding entanglement of wire with grease laden drive members.

Another feature of the invention is automatic coordination of the wire drive mechanism, the wire drive mechanism rotation mechanism, and wire drive mechanism advancing mechanism preferably based on maintaining a constant predetermined wire force on the ingot at the bottom of the cut in the ingot. This feature is accomplished through the use of a continuous deflection detector which measures the deflection distance of the wire saw either entering or leaving the work piece cut, with respect to an index position of the wire prior to engagement with the work piece. The advancing rate is adjusted to maintain a predetermined amount of deflection, and thus downward force exerted by the wire saw wire against the ingot material at the bottom of the cut. This downward force may be fixed or may be varied in accordance with a programmed schedule depending on the position of the wire saw in the cut.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 11 is a sectional view of the capstan taken along the line 10—10 in. FIG. 9 with the capstan drum 30 at one end of the wire position;

FIG. 19 is a sectional view of the apparatus taken along the line 19—19 in FIG. 3;

FIG. 19A is a sectional view of the apparatus taken along the line 19A—19A in FIG. 19;

DETAILED DESCRIPTION OF THE INVENTION

Figure 21:
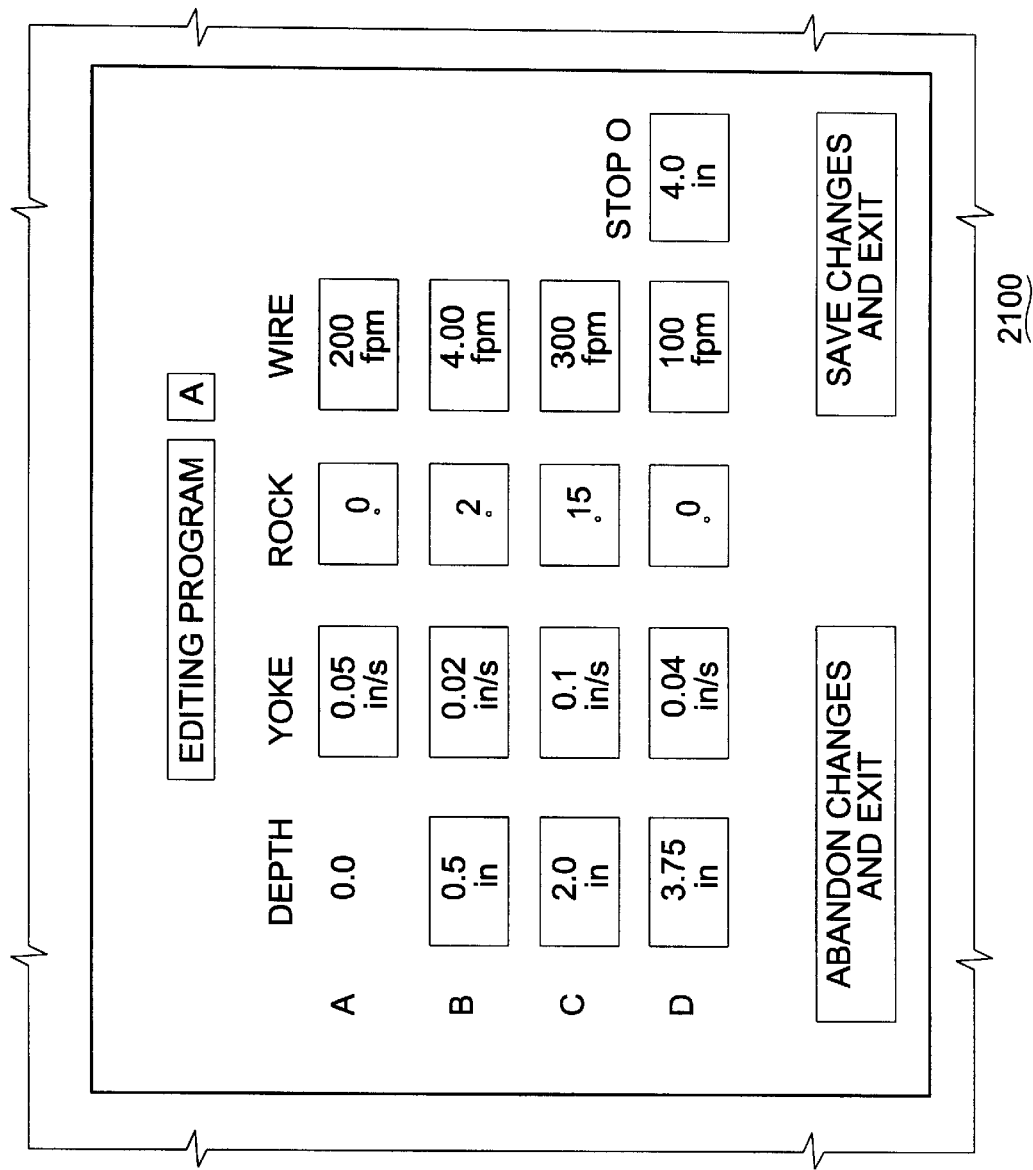
FIG. 21 is an enlarged view of the touch screen of the control console of FIG. 20.
Figure 20:
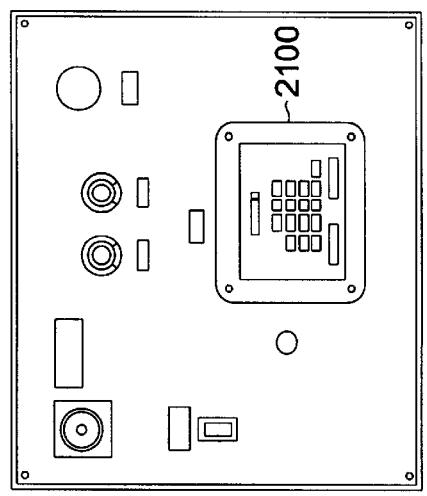
FIG. 20 is a front view of a control console in accordance with the present invention.

Referring now to the drawing, an apparatus 10 in accordance with the present invention is shown in a front view in FIGS. 1 through 4. Not shown in FIGS. 1–4 is a computer control console 2000, which can readily be seen with reference to FIGS. 20 and 21.

Referring primarily to FIGS. 1–4, the apparatus 10 (best shown in FIG. 1) comprises, in pertinent part, a cutting wire 12 (FIG. 1), which could be, for example, a diamond impregnated wire such as the Superwire™ or Superlok™ series of cutting wires available from Laser Technology West Limited, Colorado Springs, Colo. The wire 12 accurately and rapidly crops and saws a silicon ingot 14 (FIG. 3) into multiple wafers for subsequent processing into discrete or integrated circuit devices. Apparatus 10 enhances the sawing ability of wire 12 by rocking, i.e., rotating, the saw back and forth through an arc relative to the stationary ingot 14 and advancing the saw vertically through the ingot 14 as the cut progresses while driving wire 12 across ingot 14.

The apparatus 10 includes a stationary, generally rectangular frame 15 (FIG. 1), an indexing bed 17 (FIG. 1) for supporting and positioning the ingot 14 and a wire drive mechanism 16 (FIG. 3) for both moving either a continuous wire 12 in a single direction or moving a length of wire 12 in a reciprocating fashion with respect to the ingot 14 and for advancing wire 12 through ingot 14. Indexing bed 17 is equipped with at least two clamps 17a (FIG. 2) preferably in a "V" shape, to hold the ingot 14 substantially still during the cutting of ingot 14. Indexing bed 17 could be equipped (but not shown here) with a motor to incrementally advance the ingot 14 along axis subsequent cuts.

Figure 1:
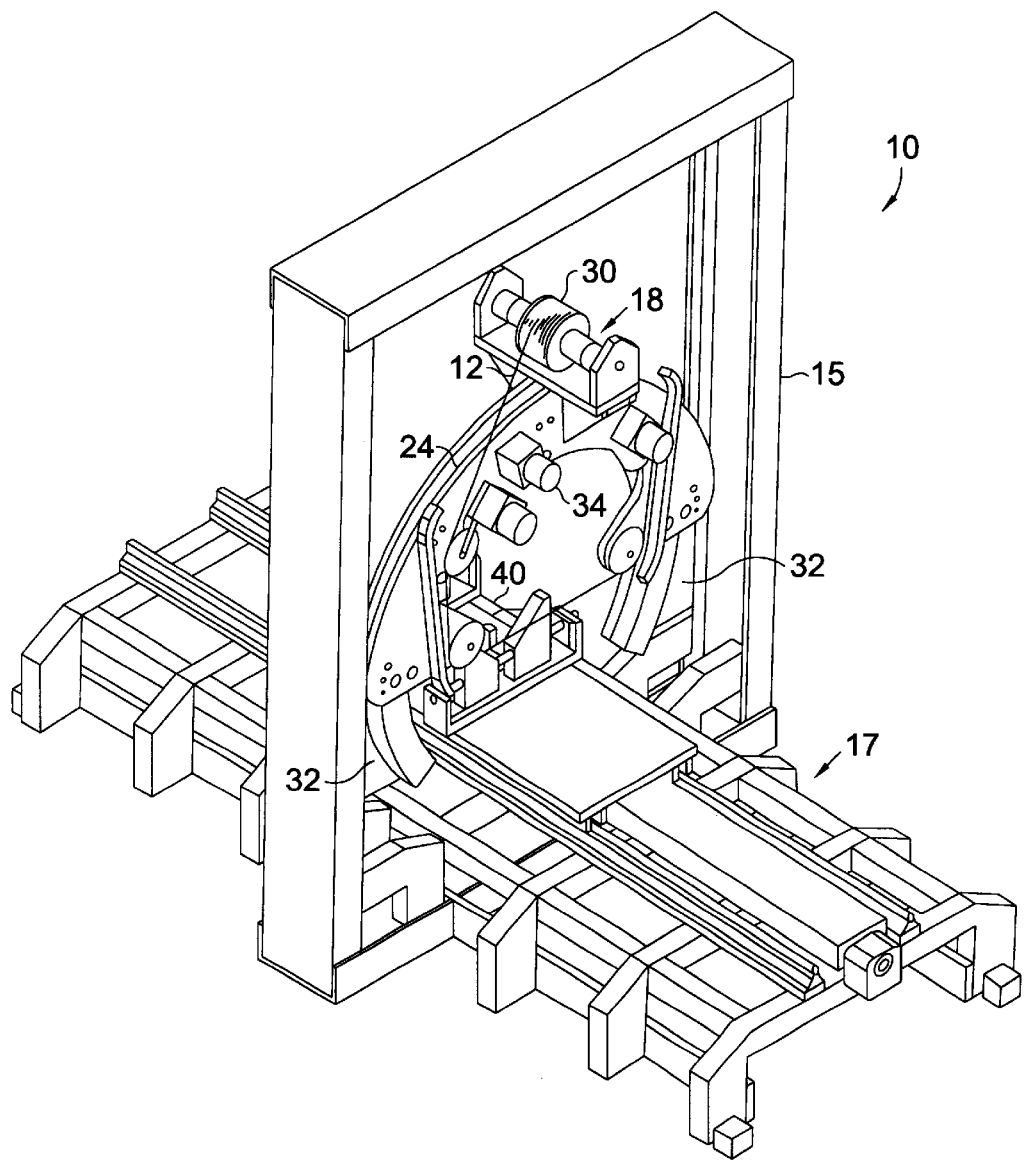
FIG. 1 is a front perspective view of an apparatus for slicing a work piece in accordance with the present invention.

The wire drive mechanism 16, in the embodiment shown, has a capstan 18 that uses a servomotor 26 (FIG. 2) to drive the length of wire 12 continuously in one direction for the length of wire 12 or back and forth in a reciprocating fashion, simultaneously winding and unwinding the length of wire on a capstan drum 30 (FIG. 1). Alternatively, if one or more individual continuous loops of wire 12 are utilized instead of a single linear length of wire, capstan 18 may drive the wire 12 continuously in a single direction without reversal.

Figure 2:
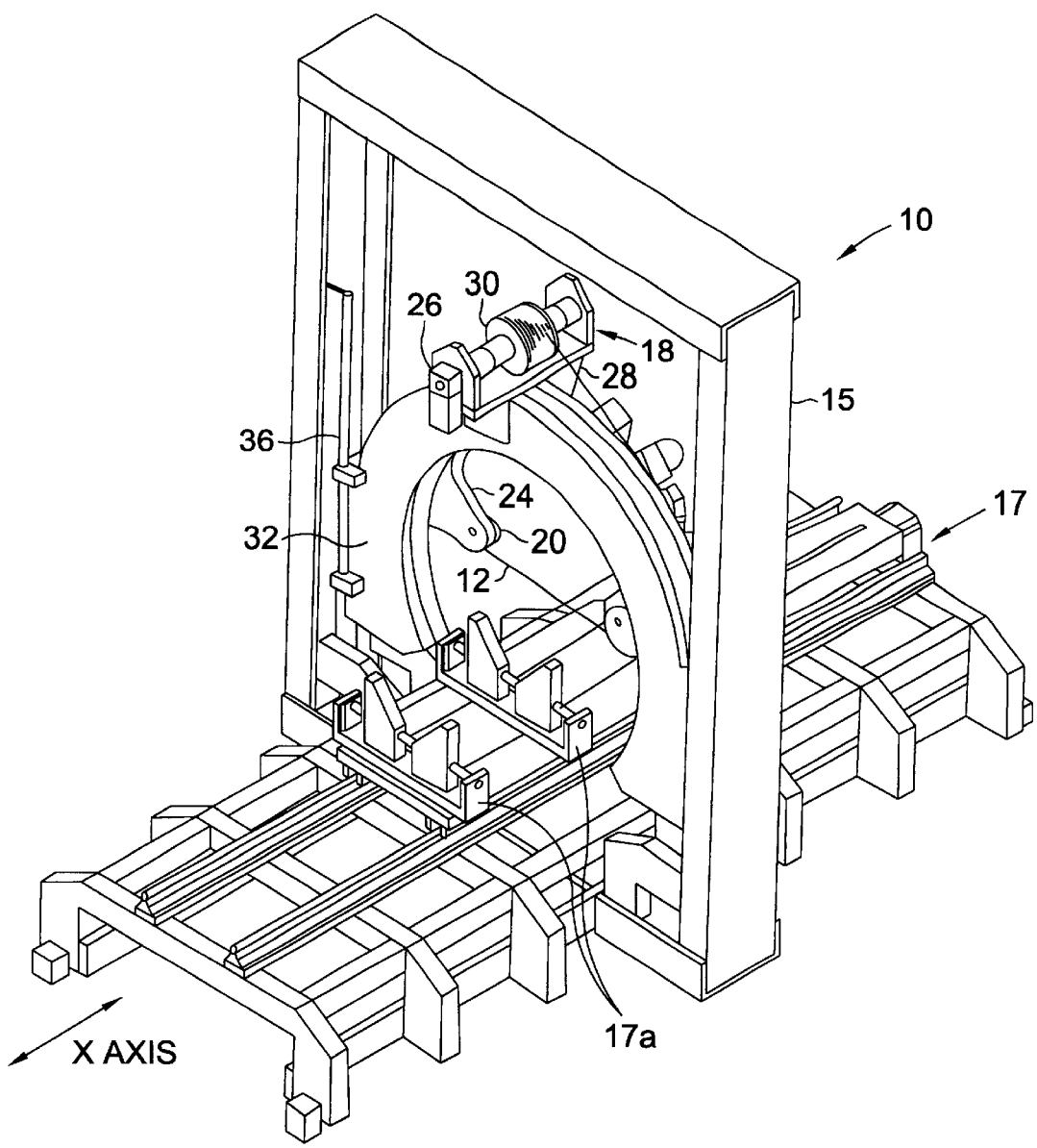
FIG. 2 is a rear perspective view of the apparatus in accordance with the present invention shown in FIG. 1.
Figure 3:
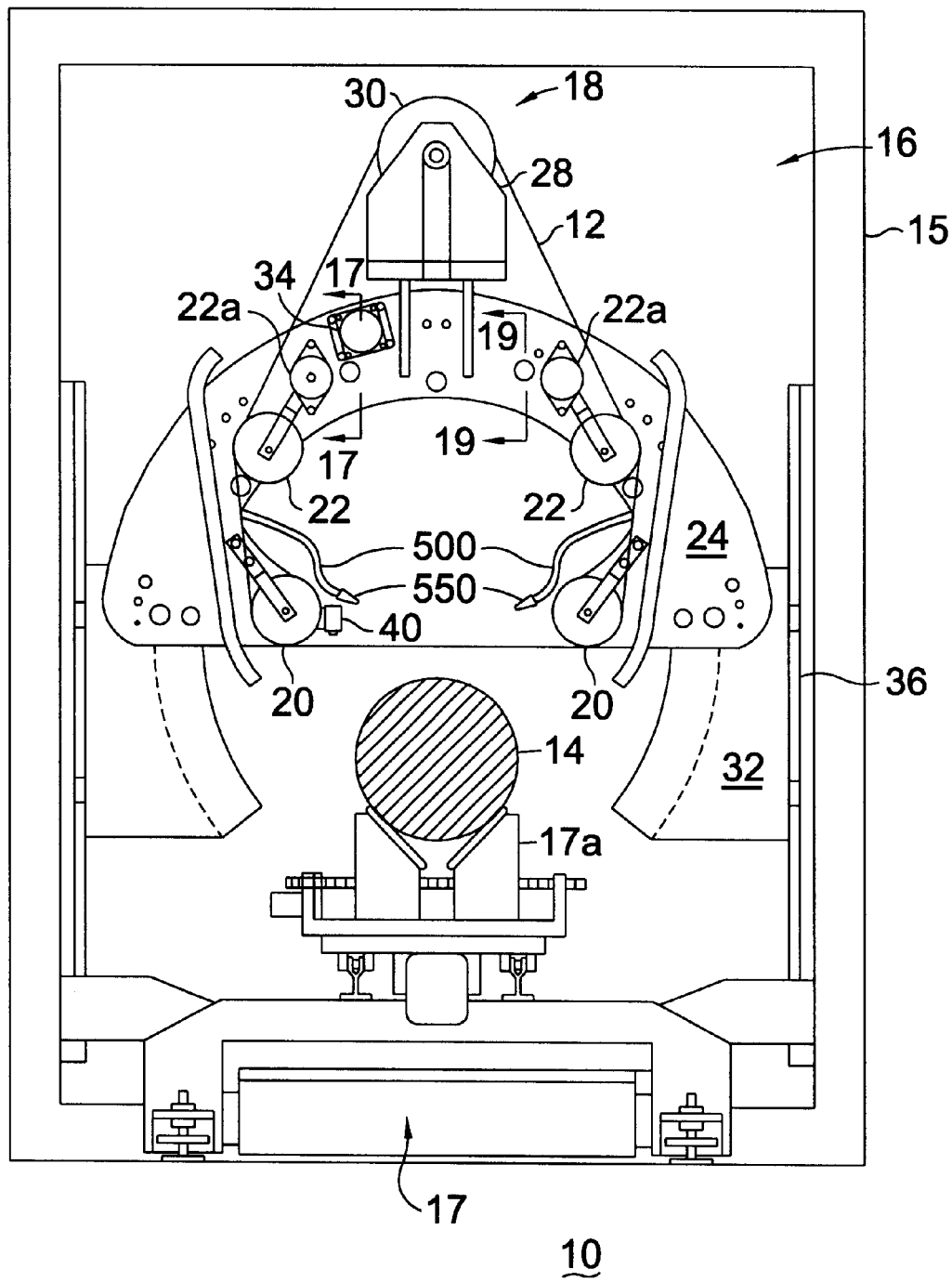
FIG. 3 is a front view of the apparatus shown in FIG. 1 with the wire drive mechanism raised above the work piece.

The wire 12 is guided in the proximity of the ingot 14 by a pair of idler pulleys 20 (FIG. 3), with proper tensioning of the wire 12 being maintained by a constant tension pulleys 22 (FIG. 3). Attached to constant tension pulleys 22 are constant force torque motors 22a (FIG. 3). Torque motors 22a, the capstan 18, idler pulleys 20, and tension pulleys 22 are all mounted to a generally upside down "U" shaped wire drive mechanism frame 24 (FIG. 2). Tension pulleys 22 are actually slideably mounted so that they can move in response to torque motors 22a to maintain wire 12 at a constant tension, which is explained in more detail below. The capstan 18 is driven by a computer controlled servomotor 26 (FIG. 2) mounted to a frame 28 (FIG. 2) of the capstan 18 which is in turn fastened to the frame 24 of the wire drive mechanism 16. The wire 12 is wrapped onto the capstan 18 such that as a capstan drum 30 (FIG. 1) rotates in one direction, wire is conveyed around one of the constant tension pulleys 22, one of the idler pulleys 20, across the ingot 14 and around the other idler pulley 20, around the other constant tension pulley 22, and back to the capstan drum 30. Approximately 600 feet of wire can be wound onto the capstan drum 30 in the presently preferred embodiment. However, more or less wire may be provided depending on the length and size of the capstan drum 30 utilized. Preferably, approximately one full layer of wire is wrapped on the capstan drum 30.

The use of the servomotor 26 as the drive motor for the capstan 18 permits the capstan drum 30 to be accurately positioned and reversed at the end of a directional rotation to within half a wrap of wire 12 remaining on the capstan drum 30. In particular, servomotor 26 sends a signal to computer console 2000. Computer console 2000 uses this signal to determine how much wire has been unwound/wound on capstan drum 30 based on the number of revolutions of capstan drum 30. When the computer console 2000 determines that capstan drum 30 has turned a preset number of revolutions (which corresponds to a length of wire that has wrapped and unwrapped) the console 2000 sends a signal that reverses the direction of servomotor 26. This maximizes the use of saw wire. Conventionally, wire saw capstans require a number of wraps, spanning about a half inch on the capstan drum 30, to remain on the capstan drum 30 to account for imprecision in the number of capstan rotations needed to reverse direction. As will be explained in more detail below, by utilizing the servomotor 26 as the capstan drive motor, accurate tracking of the angular position of the capstan drum 30 is always maintained and thus the capstan drum 30 can be precisely stopped and reversed.

Figure 9:
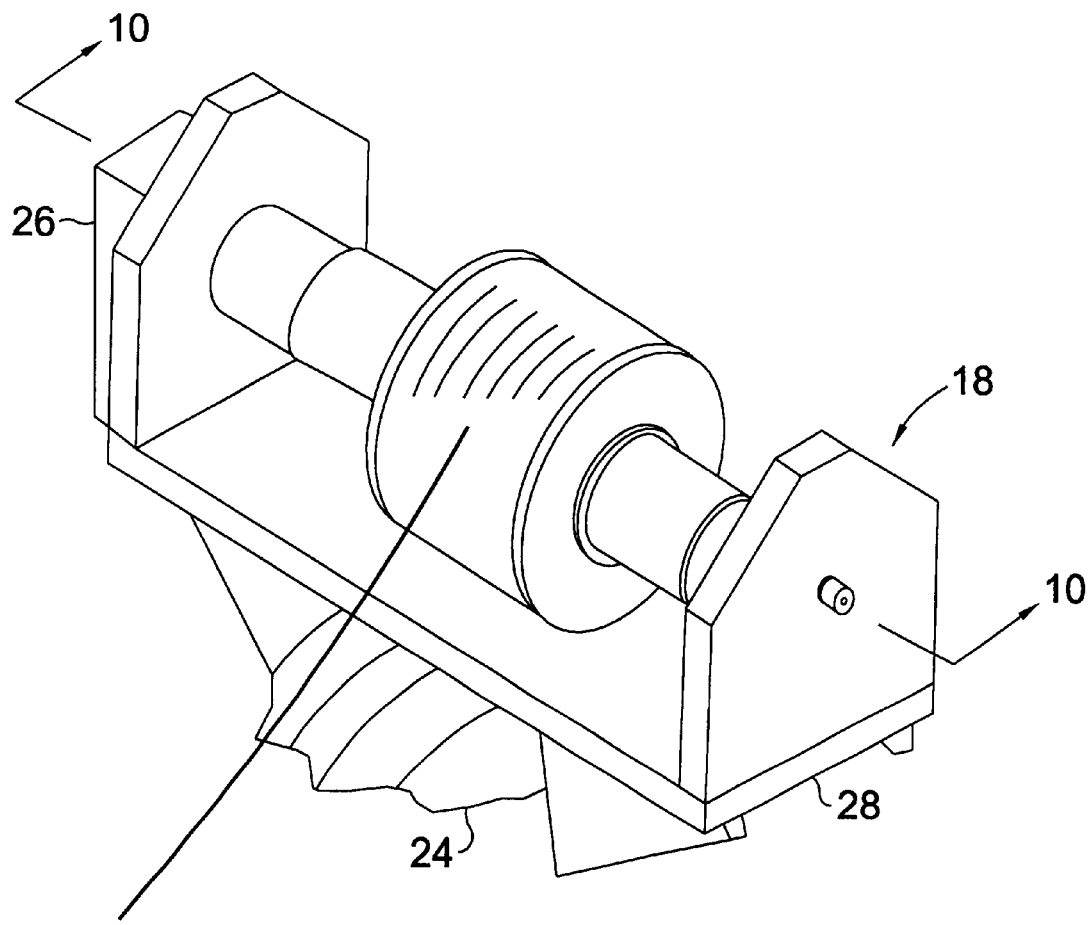
FIG. 9 is an enlarged perspective view of a capstan in accordance with the present invention.
Figure 10:
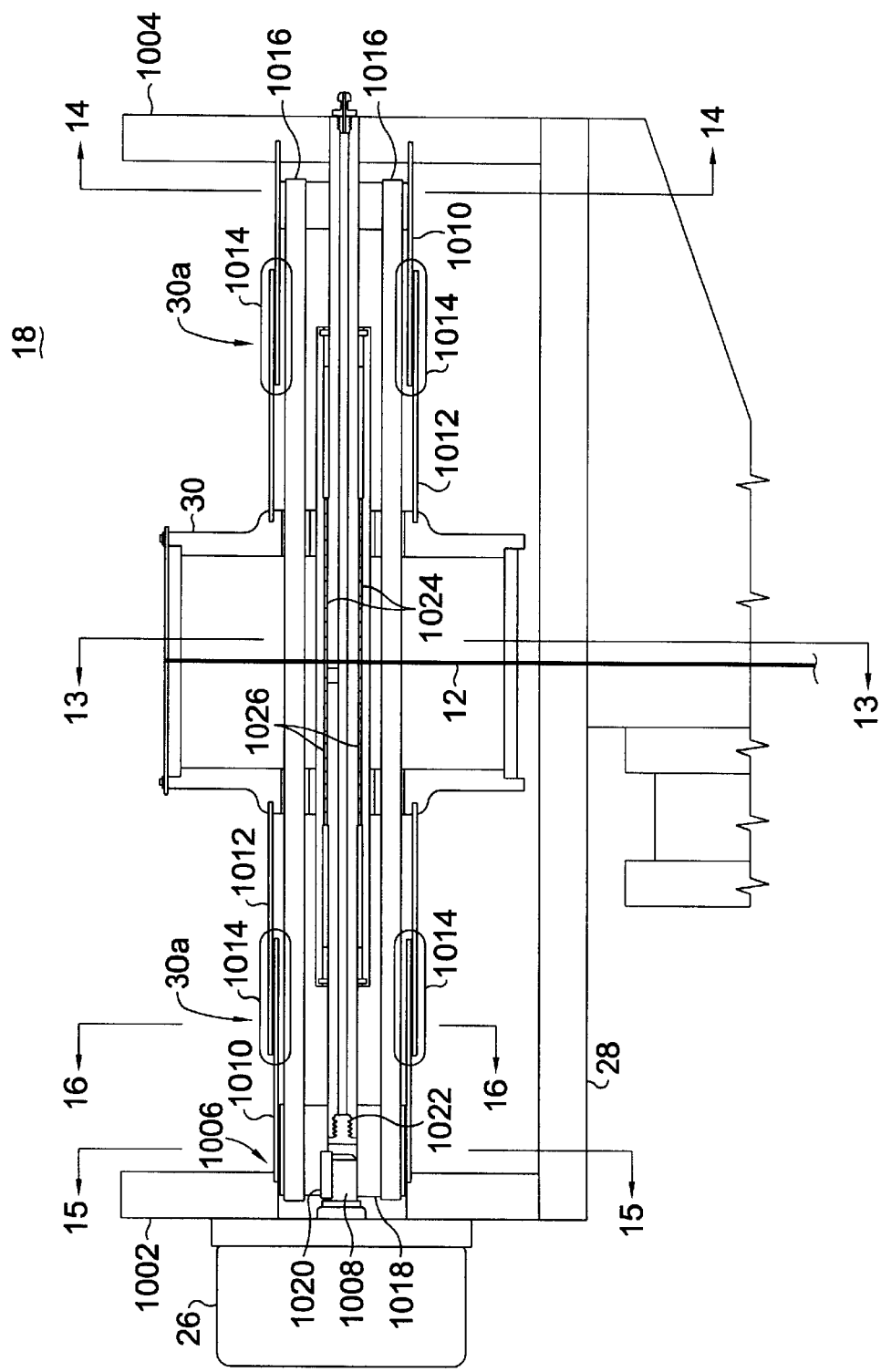
FIG. 10 is a sectional view of the capstan taken along the line 10—10 in FIG. 9 with the capstan drum 30 at a mid position.

Referring to FIGS. 9 and 10, the capstan 18 is mounted to frame 24. Capstan 18 includes the servomotor 26, the capstan frame 28, the capstan drum 30, and capstan shaft 30a. Servomotor 26 is mounted to an end 1002 of frame 28. End 1002 has an opening 1006 that a servomotor shaft 1008 extends into.

Figure 11:
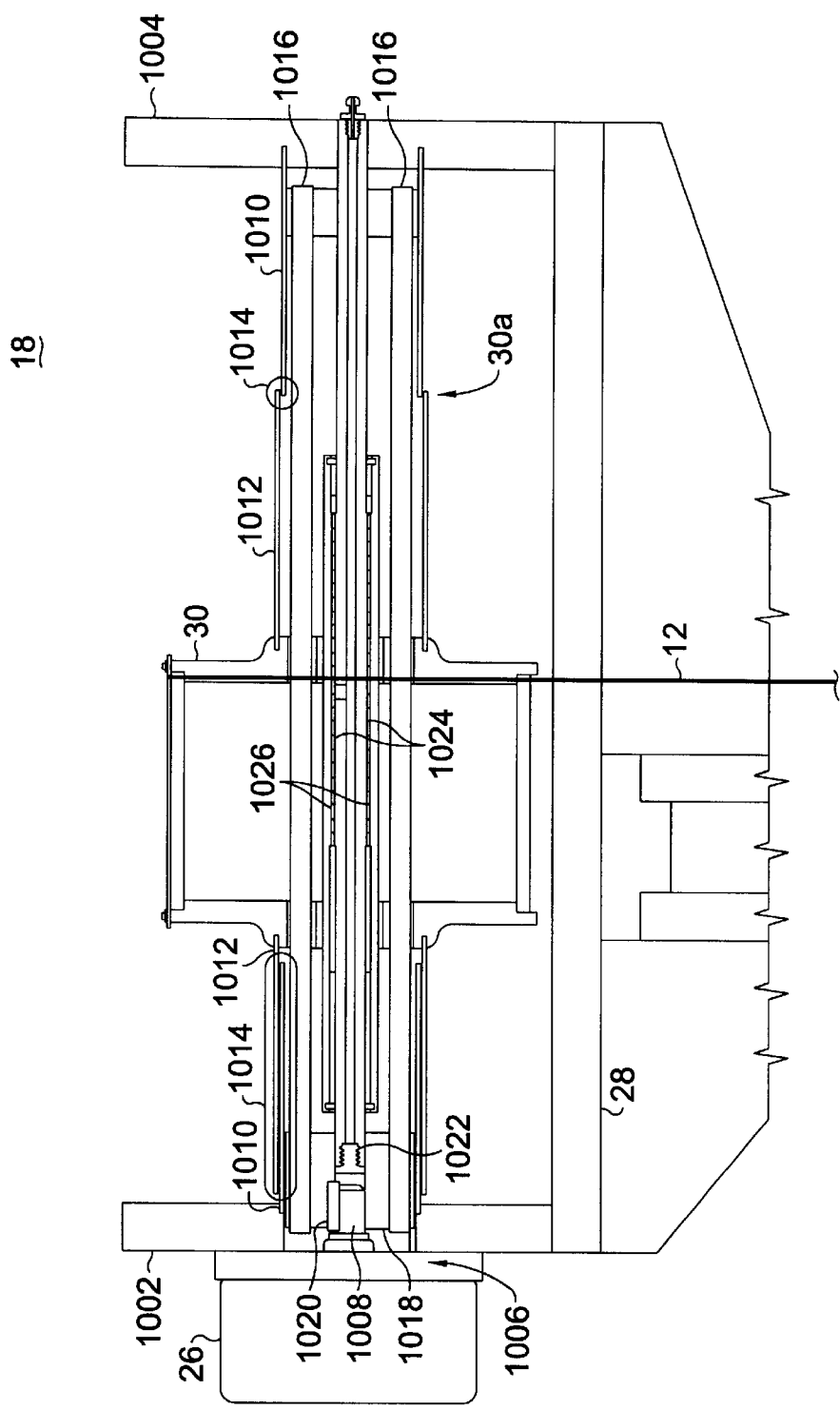
Figure 12:
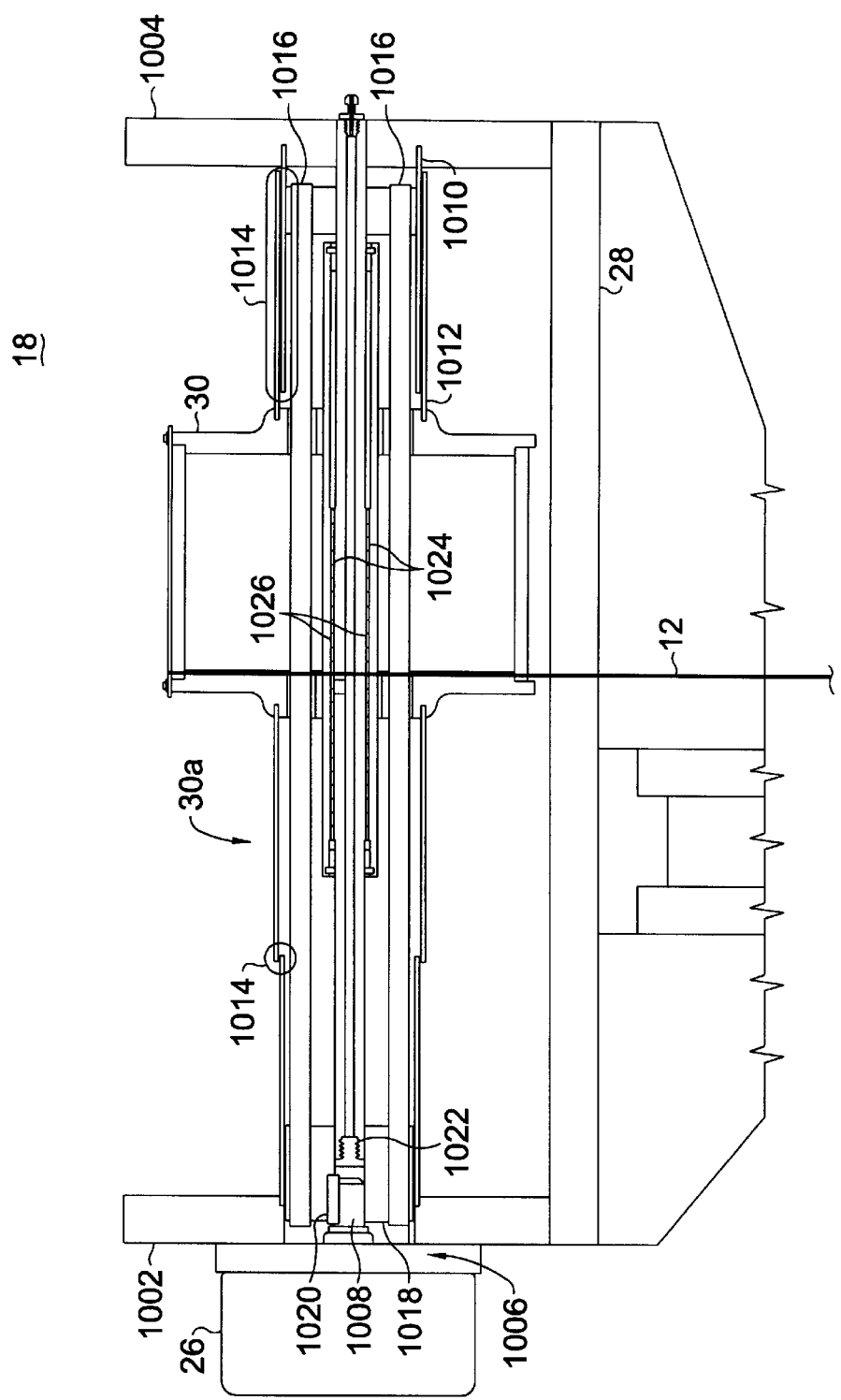
FIG. 12 is a sectional view of the capstan taken along the line 10—10 in FIG. 9 with the capstan drum 30 at the other end of the wire position.
Figure 14:
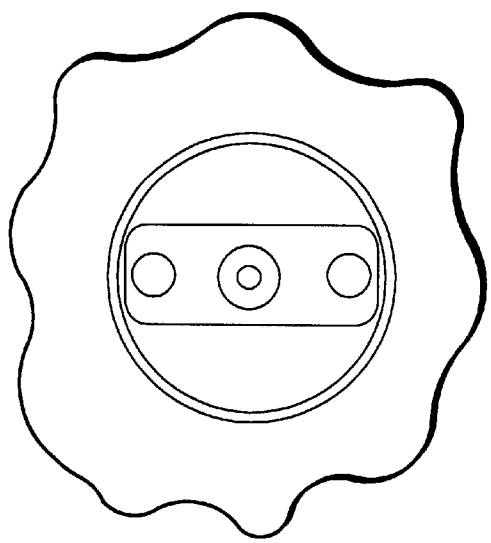
FIG. 14 is a sectional view of the capstan taken along the line 14—14 in FIG. 10.
Figure 13:
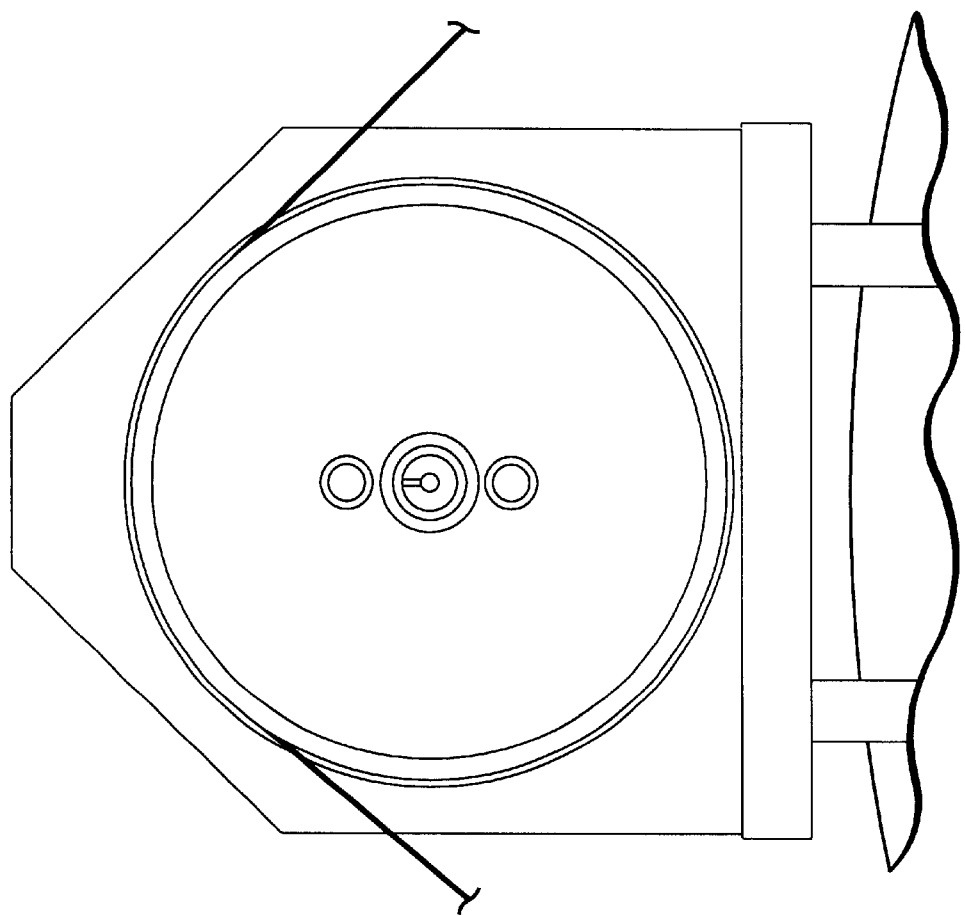
FIG. 13 is a sectional view of the capstan taken along the line 13—13 in FIG. 10.
Figure 16:
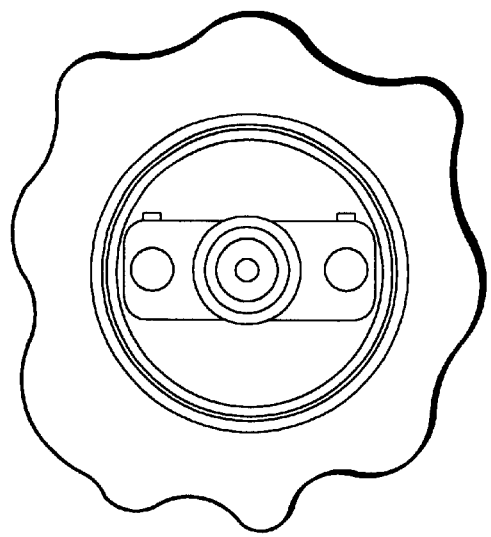
FIG. 16 is a sectional view of the capstan taken along the line 16—16 in FIG. 10.
Figure 15:
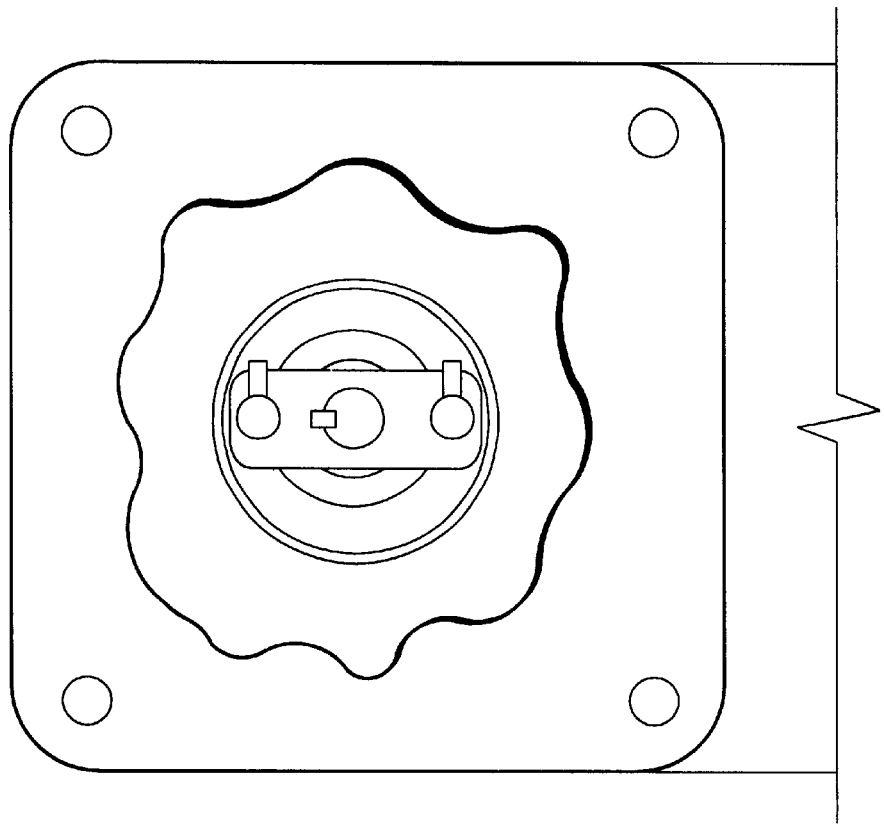
FIG. 15 is a sectional view of the capstan taken along the line 15—15 in FIG. 10.

As can be seen, shaft 30a actually comprises several components. The external portion of shaft 30a comprises a portion 1010 connected to end 1002 of frame 28 on one side and an end 1004 of frame 28 on the other side. A portion 1012 of shaft 30a is connected on both sides of drum 30. Shaft portions 1010 and 1012 are slideably coupled over area 1014 such that portion 1012 can move relative to portion 1010. A drum rotator 1016 is mounted internal to portions 1010 and 1012 and coupled to servomotor shaft 1008 at end 1002 and rotatably mounted at end 1004. Drum rotator 1016 is coupled to drum 30 also. When servomotor shaft 1008 rotates, drum rotator 1016 transfers the rotation to drum 30 causing drum 30 and shaft portion 1012 to rotate. Note that shaft portion 1010 remains fixed and does not rotate. The servomotor shaft 1008 has an arm 1020 that is connected, by a rotation transfer bearing 1018, to drum rotator 1016. Also mounted to rotation transfer bearing 1018 is a worm gear mount 1022. Worm gear mount 1022 does not rotate. Worm gear mount 1022 has teeth 1024 mounted in the drum 30 rotational area. Mounted on drum 30 are corresponding teeth 1026. When drum 30 rotates teeth 1024 and 1026 engage and act as a worm gear to move drum 30 relative to shaft portion 1010. This allows wire 12 to play out in a substantially constant position aligned with the cut in ingot 14. FIGS. 11 and 12 show the capstan drum 30 at extreme ends of movement in either direction. Notice that wire 12 plays out at substantially the same position regardless of the position of drum 30. Because wire 12 plays out at substantially the same position, it would be possible, and preferred, to enclose the capstan with a casing (not shown) that has an ingress and egress for wire 12. The casing would inhibit the wire from becoming tangled in the unlikely event of wire breakage. While having wire 12 play out at the same position is preferable, it is not necessary because the idler pulleys 20 ensure wire 12 properly aligns with the cut on ingot 14.

Figure 18:
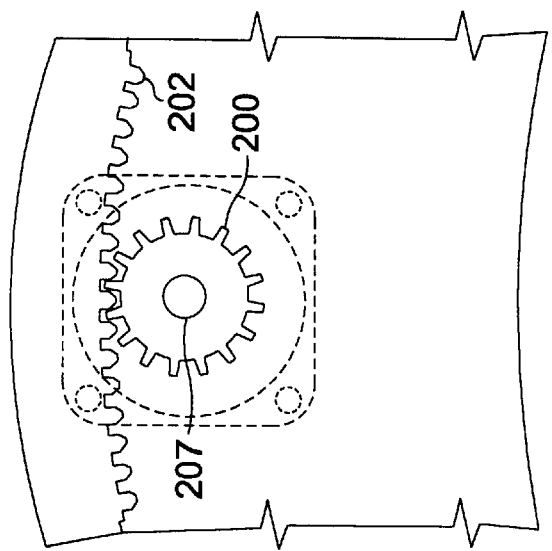
FIG. 18 is a sectional view of the apparatus taken along the line 18—18 in FIG. 17.
Figure 17:
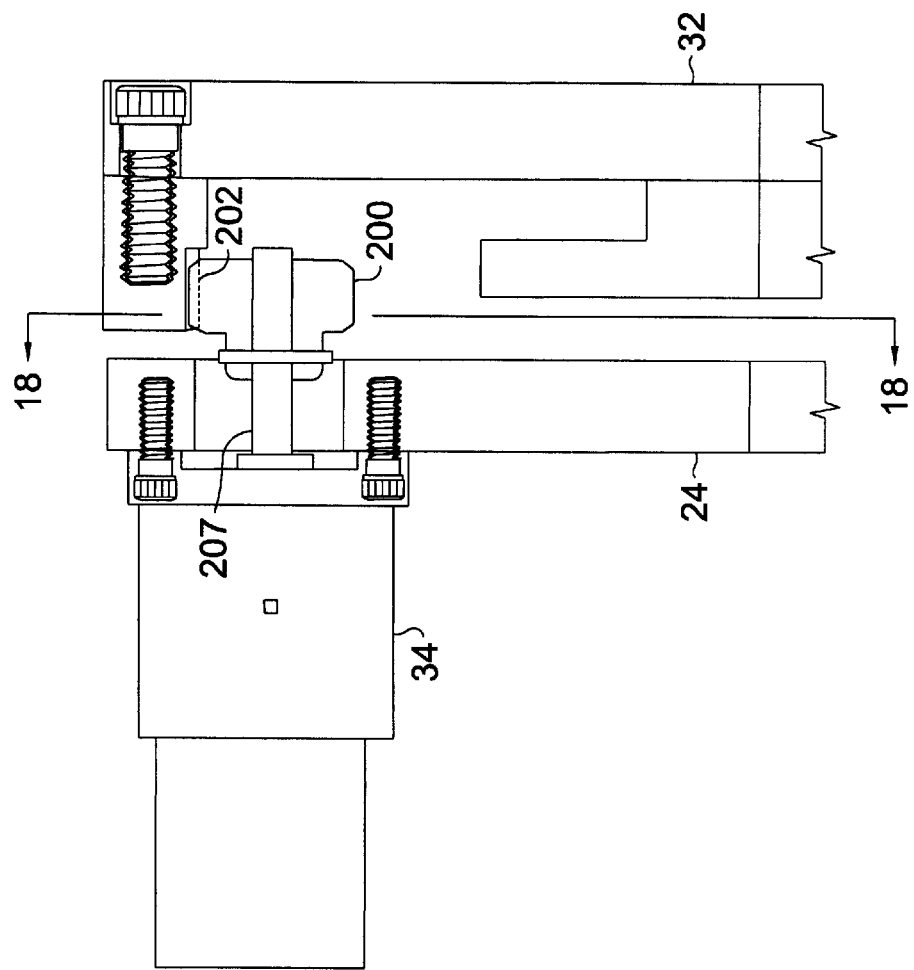
FIG. 17 is a sectional view of the apparatus taken along the line 17—17 in FIG. 3.

The wire drive mechanism 16 is mounted on a wire drive mechanism frame 24. Frame 24 comprises a generally U shaped metal plate that is rotatably mounted on an arcuate advancing frame plate 32 (FIG. 4) via a bull gear 200 (FIG. 4A) and pinion drive gear 202 (FIG. 4C) arrangement (FIGS. 4A–4C). Referring to FIGS. 17 and 18, the bull gear 200 is shown engaged with pinion drive gear 202. Bull gear 200 is mounted on a shaft 206 (FIG. 17) of stepper motor 34, which is mounted on wire drive mechanism frame 24. Stepper motor 34 receives signals from console 2000, as is explained in more detail below, that cause the stepper motor 34 to drive bull gear 200 in clockwise, counterclockwise, or some combination thereof, rotation. The rotation of bull gear 200 causes bull gear 200 to move relative to pinion gear 202, which is stationary and mounted on advancing frame plate 32. Holding pinion gear 202 stationary allows the rotation of bull gear 200 to cause wire drive mechanism frame 24 to rotate in counterclockwise and clockwise rotation about ingot 14. Thus, the wire drive mechanism 16 rocks the wire 12 about ingot 14 during cutting.

The advancing frame plate 32 is mounted to two stationary upright guide rods 36 (FIG. 4) that are mounted to the stationary frame 15. A drivemotor, not shown in the drawing figures, raises and lowers the plate 32 to raise and lower the wire drive mechanism 16. Referring to FIGS. 4A–4C and 19 and 19A. The wire drive mechanism 16 is mounted on frame 24. Frame 24 has a plurality of spring loaded ball bearings 204 (FIG. 4B) and fixed ball bearings 206 (FIG. 4B). A generally U shaped frame guide 208 (FIG. 4C) that has a wire drive mechanism track 210 (FIG. 4C) mounted on frame 24 that is connected such that the ball bearings 204 and 206 allow frame 24 to ride in track 210. Frame 208 is mounted to advancing frame plate 32. Stepper motor 34 (FIG. 4), mounted on frame 24, receives drive signals from console 2000 to drive bull gear 200. Driving bull gear 200 causes the bull gear 200 to engage pinion gear 202 and cause wire drive mechanism 16 to rotate about ingot 14. Console 2000 drives bull gear 200 in alternating directions so that wire drive mechanism 16 can rotate in a clockwise then counterclockwise direction about ingot 14.

Figure 6:
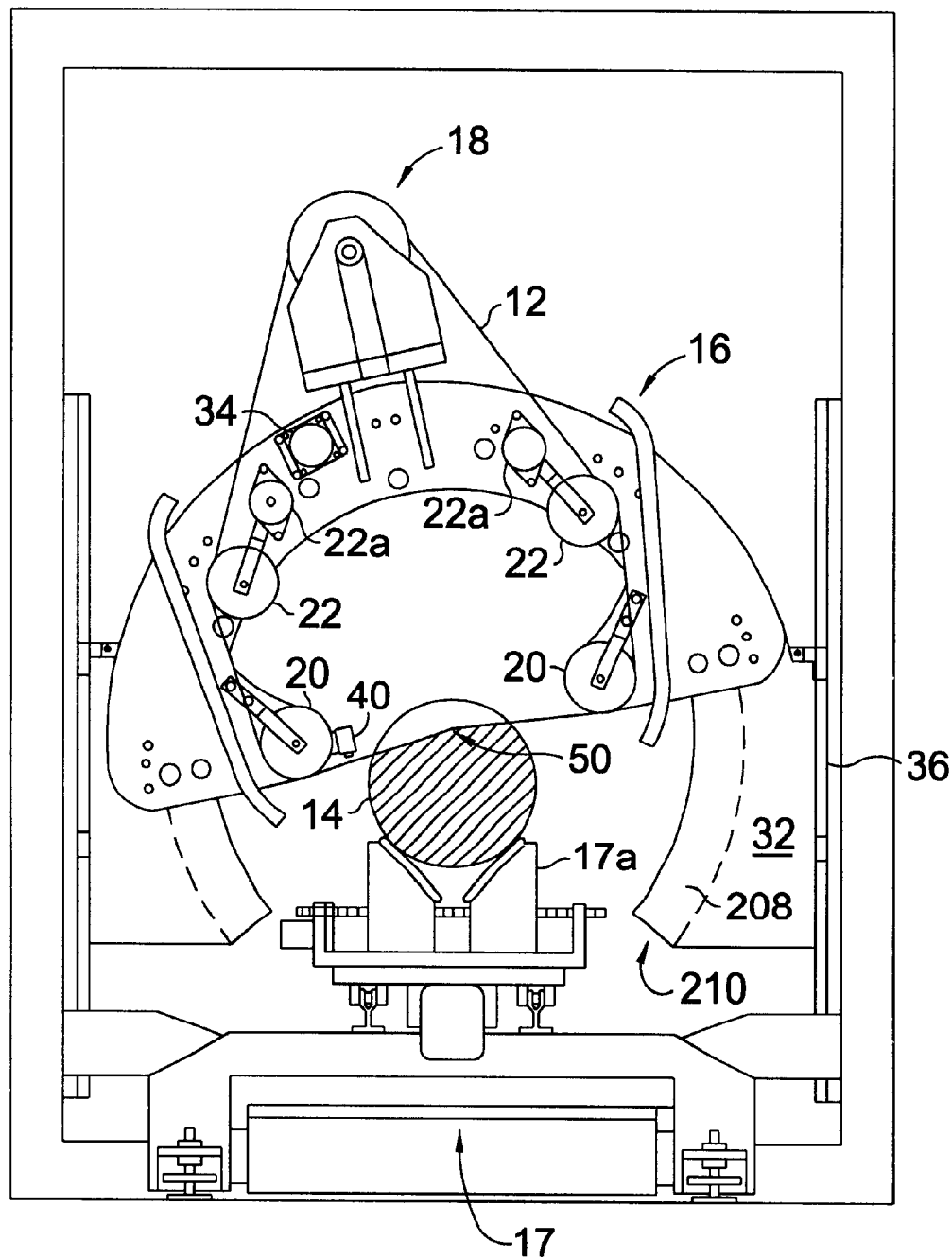
FIG. 6 is a front view of the apparatus shown in FIG. 1 with the wire drive mechanism rotated counterclockwise during the cutting of the work piece.
Figure 7:
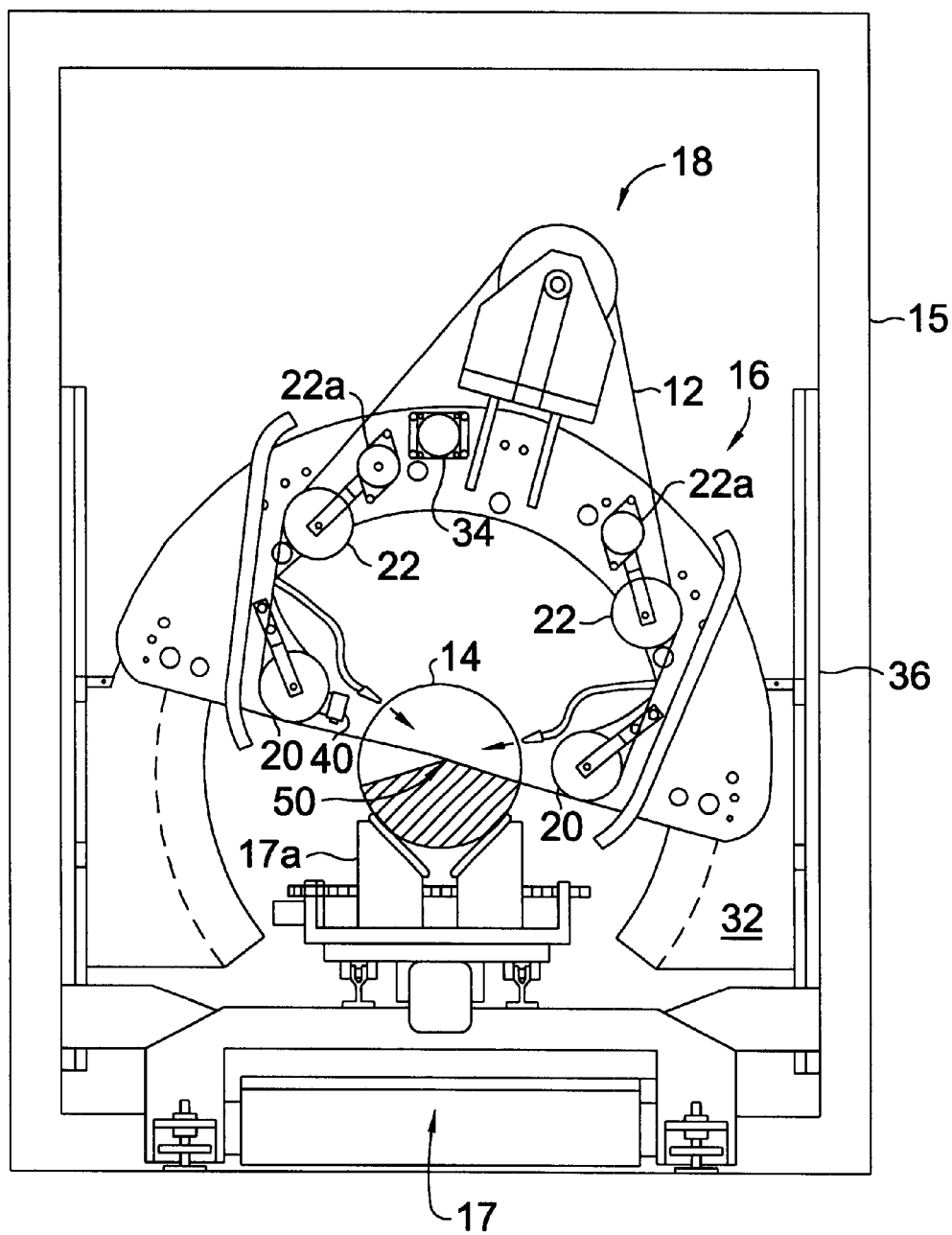
FIG. 7 is a front view of the apparatus shown in FIG. 1 with the wire drive mechanism rotated in a clockwise direction during the cutting of the work piece.

The wire drive mechanism 16 is rocked or rotated about the longitudinal axis of the ingot 14 via stepper motor 34 which turns the bull gear 200 that engages the pinion gear 202 fastened to the advancing frame plate 32. The wire drive mechanism frame 24 thus rocks counterclockwise, as shown in FIG. 6, and then clockwise, as shown in FIG. 7, as the cut through the ingot 14 progresses.

Figure 8:
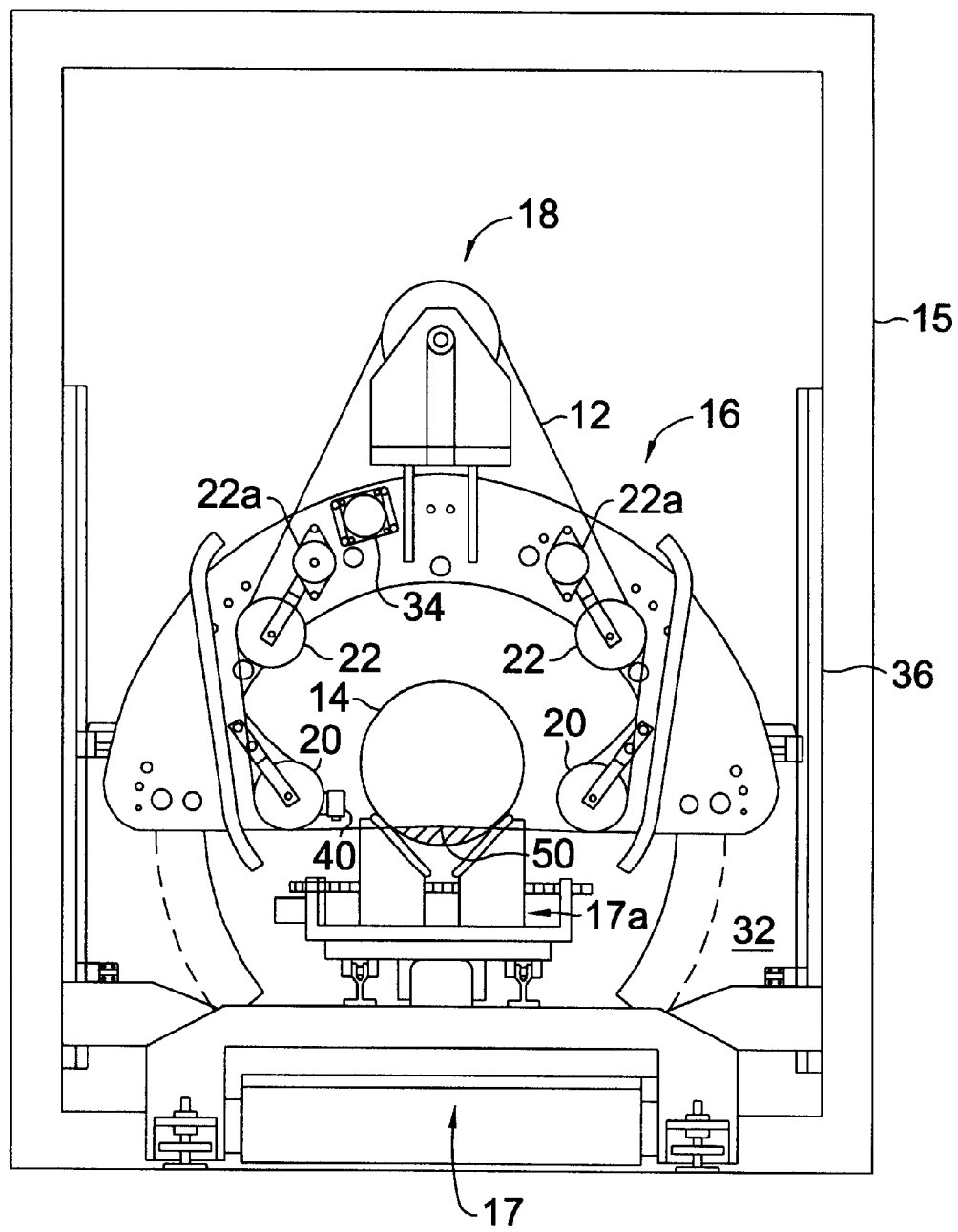
FIG. 8 is a front view of the apparatus shown in FIG. 1 with the wire drive mechanism positioned at the end cut of the work piece.

The wire saw 12 cuts a curved cut with the wire saw 12 substantially tangent to the bottom of the cut throughout the cut through the diameter of the ingot 14. The wire saw 12 maintains the tangential cut as it advances almost entirely through the ingot 14, as shown in FIG. 8. Further, the arc angle or arc length of the reciprocal rotation of the wire drive mechanism 16 may be varied in a predetermined manner throughout the duration of the cutting operation, and may vary depending on the depth of cut. For example, the arc angle in each direction may be small at the beginning and end of the cut through the diameter of the ingot 14 and larger, e.g. about 30 degrees toward the middle of the cut through the ingot 14. The purpose of the rotation, however, remains the same. That is, to maintain the wire saw substantially tangent to the cut. This minimizes the side forces on the wire saw caused by imperfections or undulations in and on the outer surface of the ingot 14.

Figure 4:
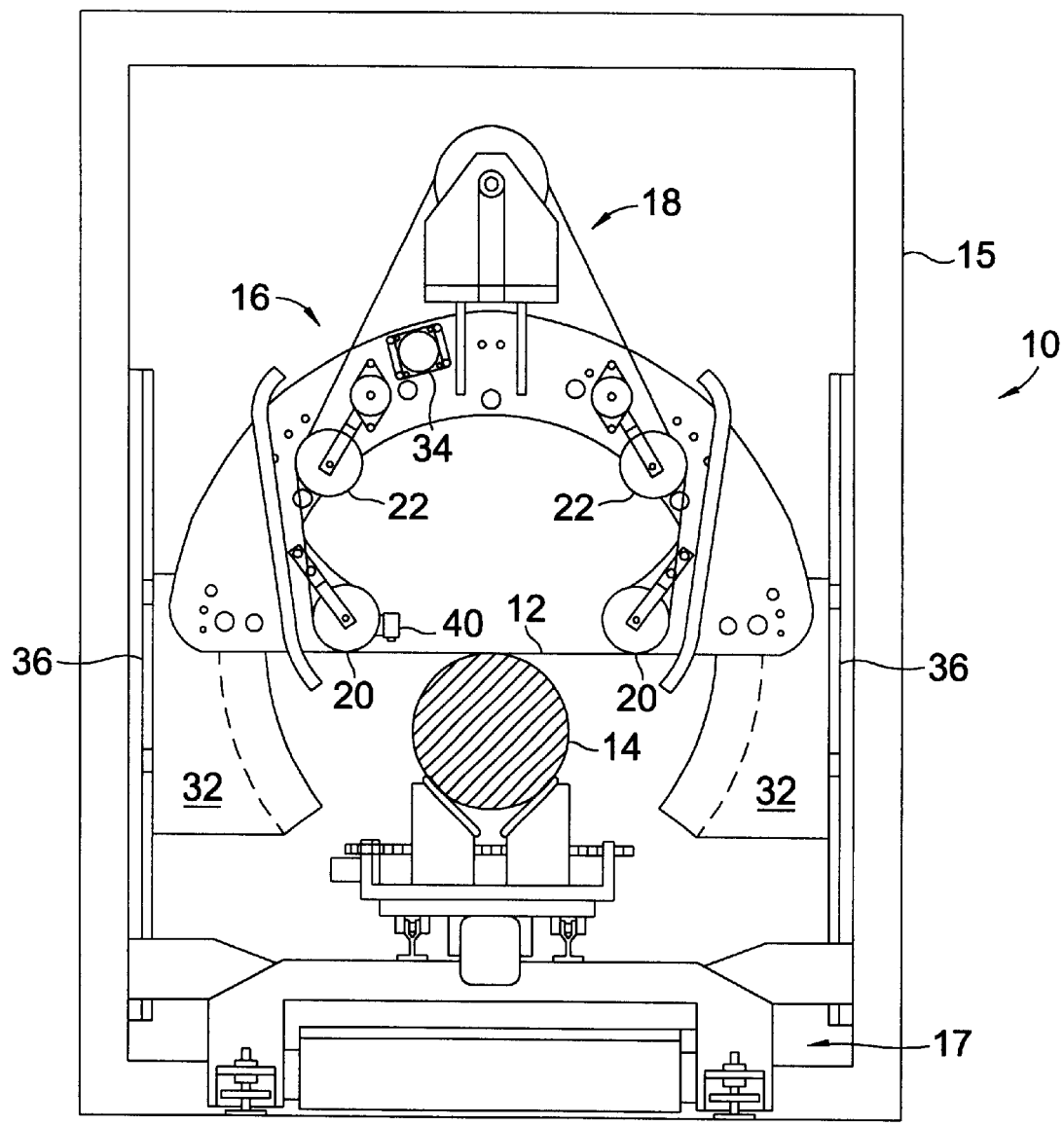
FIG. 4 is a front view of the apparatus shown in FIG. 1 with the wire drive mechanism positioned to begin slicing a work piece.
Figure 4A:
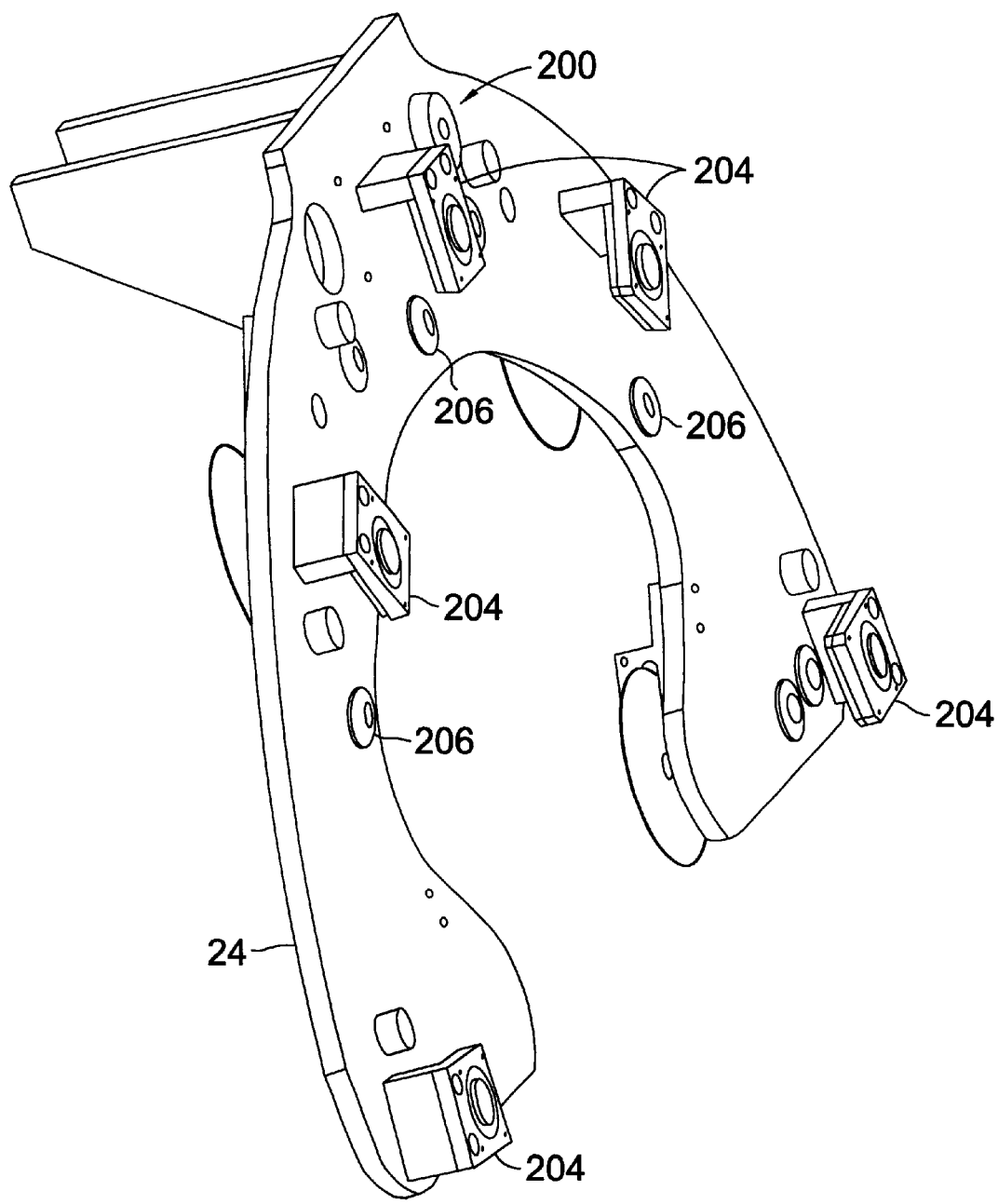
FIG. 4A is a perspective view of a backside of a wire drive mechanism in accordance with the present invention.
Figure 4C:
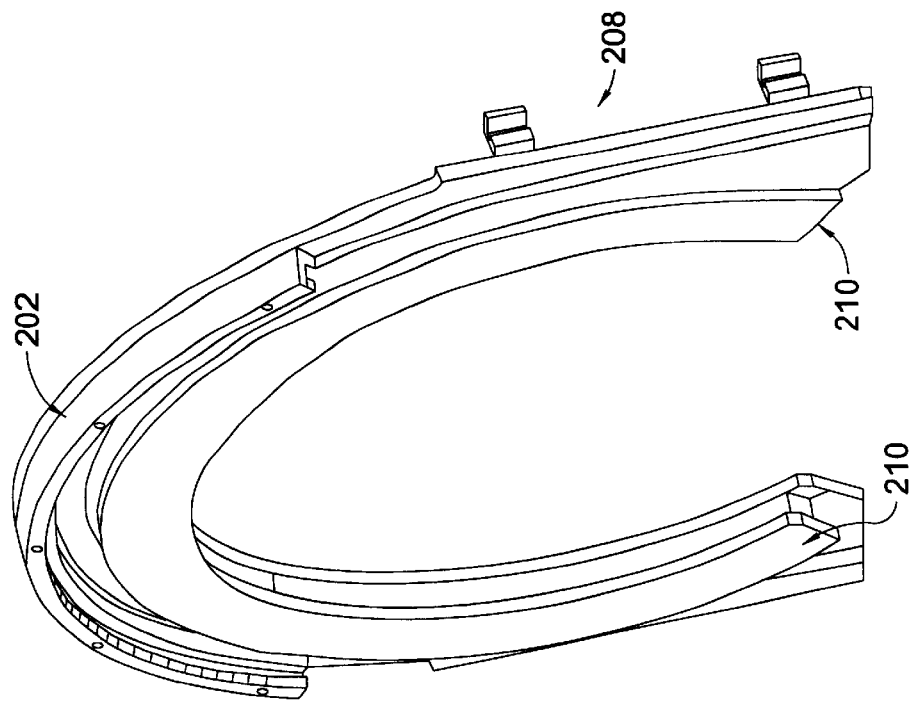
FIG. 4C is a perspective view of a frame guide in accordance with the present invention.
Figure 4B:
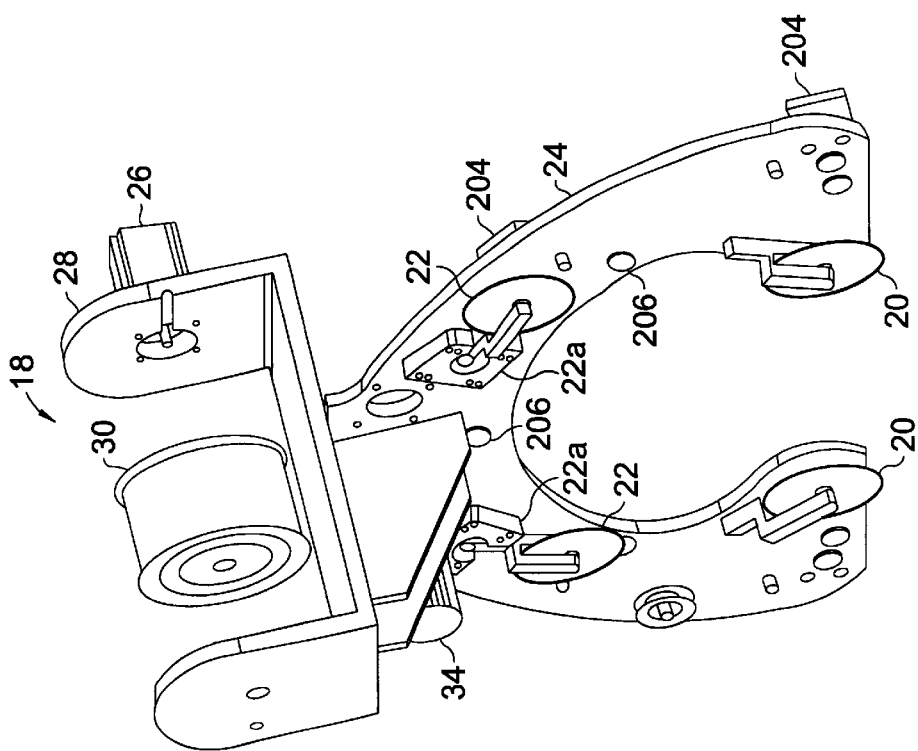
FIG. 4B is a perspective view of a front side of the wire drive mechanism of FIG. 4A.

Referring now to FIGS. 4, 6, 6, 7 and 8, the operation of cutting and the motion of the wire drive mechanism 16 is described in more detail. In FIG. 4, wire drive mechanism 16 is lowered by the drive mechanism advancing mechanism so as to just touch the surface of the ingot 14. A piece of tape, or its equivalent (not shown), placed on the surface of ingot 14 is used as a sacrificial kerf starter. The kerf starter prevents the wire 12 from wandering over the surface of ingot 14 as the cut is commenced. At this point, there is little or no deflection of the wire 12 as wire 12 is moved across ingot 14 to start the cut, as described in more detail below.

Figure 5:
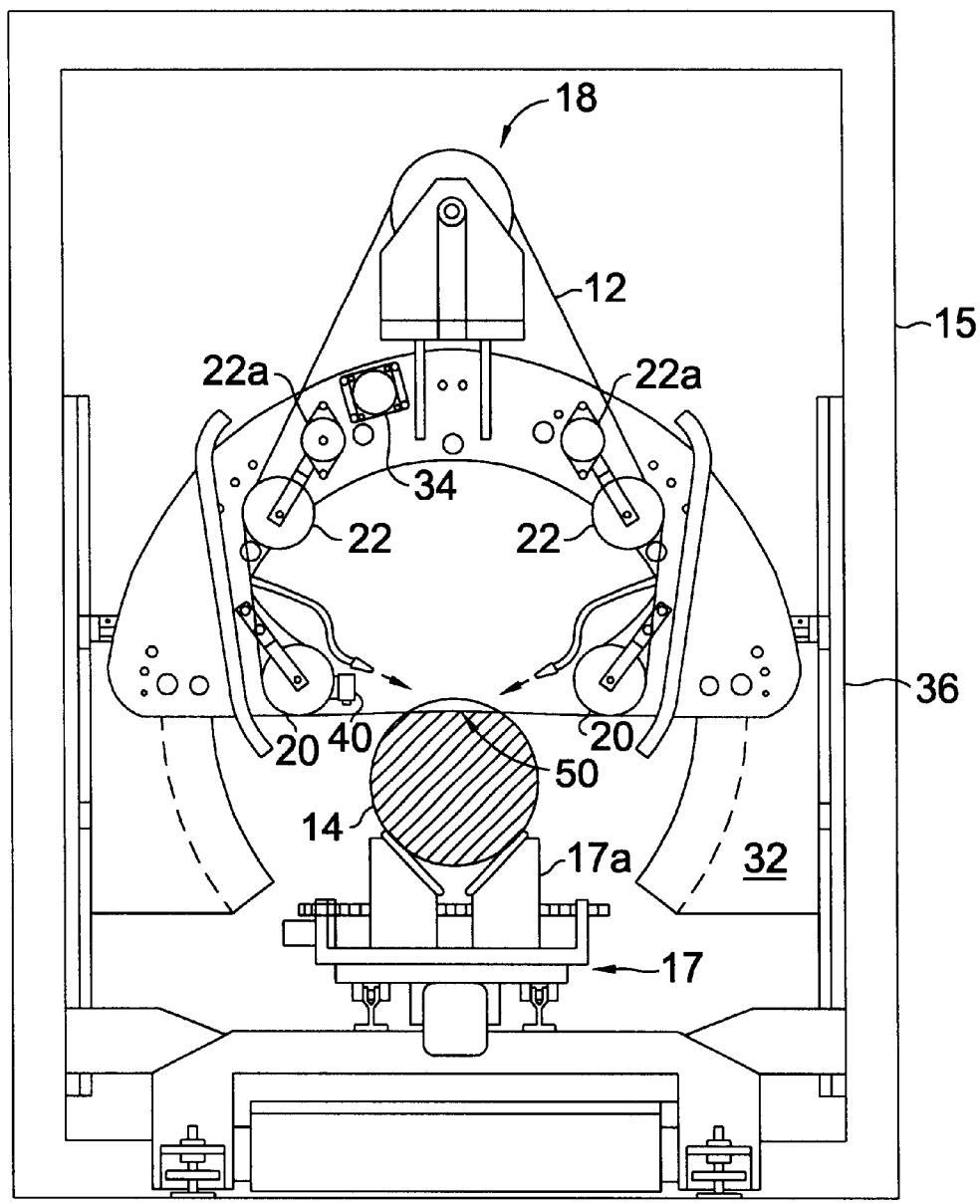
FIG. 5 is a front view of the apparatus shown in FIG. 1 with the wire drive mechanism positioned after an initial cut of a work piece.

Referring to FIG. 5, apparatus 10 has begun cutting ingot 14. As can be seen, after the initial cut (shown in FIG. 4), wire 12 begins deflecting, but maintains a cutting surface 50 substantially tangent to ingot 14. As explained in more detail below, proximity sensor 40 registers the deflection of wire 12 and generates a corresponding analog voltage signal that is sent to console 2000. Console 2000 uses the voltage to determine the tension on wire 12. Based on the tension in wire 12, torque motors 22a move tension pulleys 22 to increase or decrease the tension. Wire drive mechanism 16 does not rock during the initial cut. When advancing frame plate 32 lowers wire drive mechanism 16 deeper into the cut of ingot 14, as shown in FIG. 6, console 2000 send a rocking drive signal to stepper motor 34 that cause stepper motor 34 to drive bull gear 200. Bull gear 200 walks along pinion gear 202 in one direction and then the other. For example, wire drive mechanism 16 moves counterclockwise, in FIG. 6, and the clockwise in FIG. 7. Proximity sensor 40 operates during the rocking to ensure wire 12 maintains the proper tension. Wire drive mechanism track 210 is set so that cutting surface 50 remains substantially tangent to ingot 14 as the wire drive mechanism rocks about ingot 14.

FIG. 7 shows wire drive mechanism 16 advanced even further through ingot 14. As before, the tension of wire 12 is maintained by proximity sensor 40 sending a signal to console 2000 that causes console 2000 to move tension pulleys 22, via torque motor 22a. FIG. 7 show wire drive mechanism rocked in the clockwise direction. Again, cutting surface 50 remains substantially tangent to ingot 14.

FIG. 8 shows wire drive mechanism 16 advanced substantially through ingot 14. Advancing frame plate 32 has been lowered almost to its bottom most position. Also, console 2000, has stopped driving stepper motor 34, which in turn stops the rocking motion of the saw. Again, proximity sensor 40 maintains a constant tension on wire 12.

As can be seen from the sequence of FIGS. 4, 5, 6, 7 and 8, the rocking of the saw starts at a minimum rocking motion, which is preferably zero (FIG. 5). Preferably, the rocking gradually increases after the initial cut and increases towards a maximum towards the middle of the cut (FIG. 7). Preferably, at the maximum rocking, the wire drive mechanism 16 rocks 30° in either direction off about the centerline (i.e., about 90° of rotation), but more or less motion is possible. From the maximum rocking towards the center position, the rocking motion gradually decreases back to a minimum, which is preferably zero rocking, at the bottom of the cut (FIG. 8).

Figure 23:
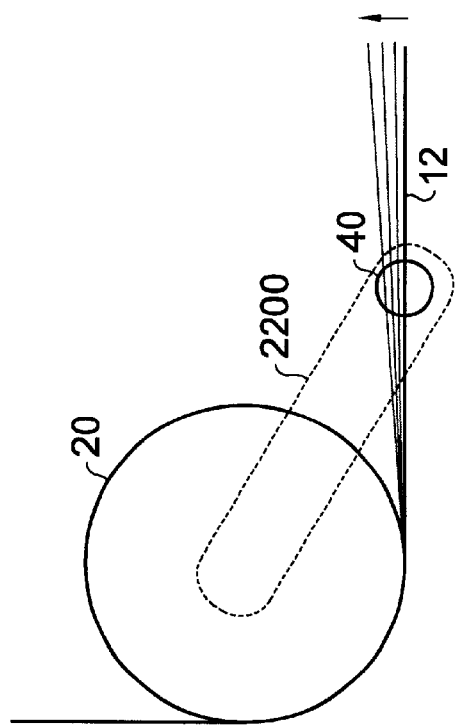
FIG. 23 is an enlarged view of an alternative embodiment of an inductive proximity sensor and cutting wire as shown in FIG. 1 illustrating the position of the sensor to detect the bow of the cutting wire as it moves from an unbowed position substantially bisecting the cross-sectional face of the sensor at the diameter thereof to where a lesser chord across the face of the sensor is detected.

The index or undeflected position of the wire saw 12 is detected by an inductive proximity sensor 40 (FIGS. 3 and 22) positioned adjacent the wire 12 on the wire drive mechanism frame 24. This sensor 40 generates an analog voltage proportional to the angle of wire deflection from the index position. The analog voltage is sent to console 2000 as a tension signal. As downward force on the ingot 14 increases, the deflection increases (FIG. 23). The change in deflection corresponds to a proportional change in the analog voltage signal from sensor 40. Because the constant force torque motors 22*a* supporting the tension pulleys 22 maintain a constant tension on the wire, the deflection distance becomes an accurate measurement of the force being exerted by the wire saw 12 on the semiconductor crystal in the cut.

Figure 22:
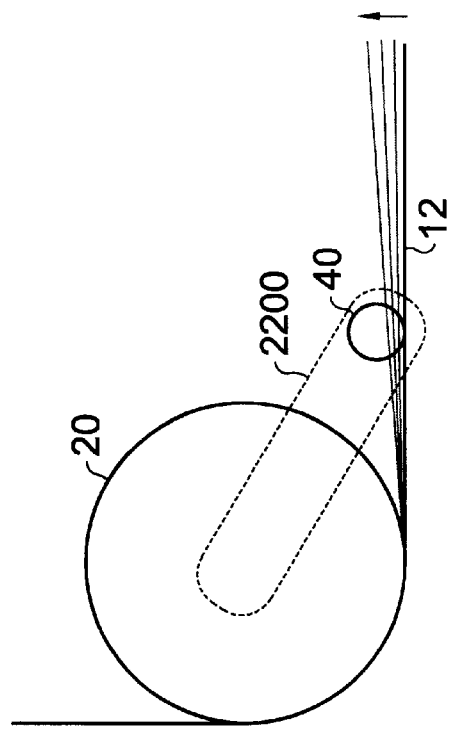
FIG. 22 is an enlarged view of an inductive proximity sensor and cutting wire of the apparatus shown in FIG. 1 illustrating the position of the sensor to detect the bow of the cutting wire as it moves from an unbowed position substantially tangential to the cross-sectional face of the sensor to where a greater chord across the face of the sensor is detected.

The force on wire 12 must be monitored carefully to minimize wire breakage and optimize the cutting operation. The computer console 2000 monitors the analog voltage and maintains a constant deflection by sending positioning signals to torque motors 22*a* during rocking of the wire drive mechanism 16 and advancement of the advancing mechanism to optimize the cutting operation. FIGS. 22 and 23 show idler pulley 20 with proximity sensor 40 connected in the vicinity of wire 12.

FIG. 22 shows wire 12 in a non-cutting or an initial cutting position. In this position, wire 12 passes just off of a tangential position with respect to the circumference of the circular cross-sectional face of the inductive proximity sensor 40 as maintained in position by bracket 2200. This position causes the proximity sensor 40 to generate a reference or idle voltage that corresponds to zero downward cutting force. Proximity sensor 40 sends this analog voltage to console 2000. The wire 12 will be slightly deflected upwards (indicated by the other dashed positions of the wire 12 in the direction of the arrow), in response to beginning a downward cutting force. Because of this deflection, wire 12 then begins to be sensed by the proximity sensor 40 and a lesser analog voltage is then generated by the sensor 40 that corresponds to the greater downward force. As the downward force increases, the chord the wire 12 forms over the face of the proximity sensor 40 increases resulting in proximity sensor 40 generating an even lower voltage. Console 2000 receives this lower voltage and sends a signal that causes torque motors 22*a* to reposition tension pulleys 22 to decrease the tension on wire 12. Conversely, if the downward force decreases, the chord formed by the wire 12 with respect to the face of the proximity sensor 40 decreases resulting in proximity sensor 40 generating a higher voltage. Console 2000 receives the higher voltage and sends a signal that causes torque motors 22*a* to reposition tension pulleys 22 to increase the tension on wire 12. Other proximity sensor configurations would work also. While it is preferred to precisely control the position of tension pulleys 22 using a motor 22*a*, other embodiments to maintain tension would also work. For example, tension pulleys 22 could be positioned by a spring that compresses and expands to maintain a constant tension on the wire 12.

With reference to FIG. 23, an alternative configuration of the sensor 40 and wire 12 is shown wherein the initial position of the wire with respect to the face of the sensor 40 is substantially along the diameter thereof. In this instance, as the wire is deflected from this position by a downwards cutting force, a lesser chord due to the wire's presence is sensed and a correspondingly greater voltage level is then produced by the sensor 40. The functionality previously described with respect to the wire tensioning of the embodiment of FIG. 22 could then be applied. The embodiment of this figure has the advantage of being able to sense the absence of the wire 12 due, for example, to potential wire breakage. In the event no wire 12 is sensed by the sensor 40, the voltage output of the sensor 40 would be greater than that of the initial value when it is positioned substantially along the diameter thereof.

As shown in FIG. 3, tubes 500 and nozzles 550 are mounted on wire drive mechanism 16. Tubes 600 and nozzles 550 blow a water and air mixture onto the wire 12 as it enters and/or leaves the kerf of ingot 14 to aid in keeping the kerf free of debris. Tubes 500 are preferably mounted on frame 24 to blow air into the kerf at a constant angle to the cutting surface 50. The water and air mixture is kept in a pressurized tank, not shown, and connected to tubes 500.

While there have been described above the principles of the present invention in conjunction with specific apparatus and wire sawing techniques, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. An apparatus for cutting a substantially cylindrical work piece in a direction generally perpendicular to a longitudinal axis of the work piece; comprising:

a wire having a plurality of cutting elements; and a wire drive mechanism for driving the wire across and through the work piece, where the wire drive mechanism includes a capstan to move the wire orthogonally across a longitudinal axis of the work piece, a rotational drive to oscillate the wire around the longitudinal axis, and an advancing drive to advance the wire perpendicularly through the longitudinal axis of the work piece.

2. The apparatus of claim 1 wherein the cutting elements include diamonds.

3. The apparatus of claim 1 wherein the wire further comprises:
 a steel core; and
 a surrounding copper sheath.

4. The apparatus of claim 3 wherein the cutting elements are affixed to the copper sheath.

5. The apparatus of claim 3 wherein the wire further comprises a nickel layer surrounding the copper sheath.

6. The apparatus of claim 1 wherein the cutting elements are distributed substantially uniformly over the wire.

7. The apparatus of claim 1, wherein the wire drive mechanism further comprises:
 at least one tension pulley slidably mounted on the wire drive mechanism to maintain the wire at a predetermined tension during the cutting of the work piece; and
 at least one idler pulley mounted on the wire drive mechanism to align the wire with the work piece.

8. The apparatus of claim 7, wherein the wire drive mechanism further comprises:
 at least one torque motor coupled to the at least one tension pulley, wherein the at least one torque motor positions the at least one tension pulley to maintain the wire at the predetermined tension.

9. The apparatus of claim 7, wherein the wire drive mechanism further comprises:
 at least one spring coupled to the at least one tension pulley, wherein the at least one spring positions the at least one tension pulley to maintain the wire at the predetermined tension.

10. The apparatus of claim 1, wherein the capstan further comprises:
 a capstan frame mounted to the wire drive mechanism;
 a shaft having a fixed portion mounted to the capstan frame and rotating portion slidably coupled to the fixed portion;
 a capstan drum coupled to the rotating portion of the shaft, the capstan drum is movable relative to the fixed portion of the shaft;
 a motor having a motor shaft where the motor shaft is coupled to the rotating portion of the shaft to rotate the capstan drum and move the wire orthogonally across the longitudinal axis of the work piece.

11. The apparatus of claim 10, wherein the capstan drum is mounted on a drum worm gear such that when the motor rotates the capstan drum the drum worm gear causes the capstan drum to move relative to the fixed portion of the shaft.

12. The apparatus of claim 11, wherein the capstan drum moves so that the wire plays out from the capstan at a substantially constant position.

13. The apparatus of claim 12, wherein the capstan further includes an enclosure.

14. The apparatus of claim 1, wherein the advancing drive further comprises
 a frame plate;
 at least one substantially stationary guide post coupled to the frame plate; and
 an incremental drive mechanism coupled to the at lest one guide post and frame plate to incremental advance the frame plate along the guide post during the cutting.

15. The apparatus of claim 14 wherein the incremental drive mechanism further comprises:
 a guide post worm gear mounted on the stationary guide post coupled to the frame plate; and
 a motor coupled to the guide post worm gear, the motor rotating the worn gear to cause the frame plate to move along the guide post.

16. The apparatus of claim 1 wherein the rotational drive further comprises:
 a rotational drive motor;
 a rotational drive gear coupled to the rotational drive motor; and
 a rotational drive track connected to the rotational drive gear, wherein the rotational drive motor and rotational drive gear cause the wire to oscillate around the work piece on the rotational drive track.

17. The apparatus of claim 16 wherein the rotational drive gear further comprises:
 a bull gear; and
 a pinion gear.

18. The apparatus of claim 17 wherein the rotational drive track is connected using ball bearings.

* * * * *

UNITED STATES PATENT AND TRADEMARK OFFICE
CERTIFICATE OF CORRECTION

PATENT NO.      : 6,279,564 B1
DATED           : August 28, 2001
INVENTOR(S)     : John B. Hodsden and Steven M. Luedders It is certified that error appears in the above-identified patent and that said Letters Patent is hereby corrected as shown below:

<u>Claim 14,</u>
Line 16, change "lest" to -- least --

Signed and Sealed this

Twelfth Day of March, 2002

Attest:

Attesting Officer

JAMES E. ROGAN
Director of the United States Patent and Trademark Office